(12) United States Patent
Wang et al.

(10) Patent No.: US 11,499,654 B2
(45) Date of Patent: Nov. 15, 2022

(54) PROVISION OF ELECTRICAL CONTINUITY AND/OR RADIAL SUPPORT

(71) Applicant: BAKER HUGHES ENERGY TECHNOLOGY UK LIMITED, Bristol (GB)

(72) Inventors: Sui Wang, Newcastle (GB); Andrew Roberts, Chester-le-Street (GB); Laurence Baldwin, Cumbria (GB); Richard Clements, Durham (GB)

(73) Assignee: Baker Hughes Energy Technology UK Limited, Bristol (GB)

( * ) Notice: Subject to any disclaimer, the term of this patent is extended or adjusted under 35 U.S.C. 154(b) by 322 days.

(21) Appl. No.: 16/493,101

(22) PCT Filed: Mar. 16, 2018

(86) PCT No.: PCT/GB2018/050700
§ 371 (c)(1),
(2) Date: Sep. 11, 2019

(87) PCT Pub. No.: WO2018/167518
PCT Pub. Date: Sep. 20, 2018

(65) Prior Publication Data
US 2021/0142931 A1    May 13, 2021

(30) Foreign Application Priority Data

Mar. 16, 2017 (GB) .................................. 1704214
Mar. 16, 2017 (GB) .................................. 1704217

(51) Int. Cl.
*F16L 11/00* (2006.01)
*F16L 11/16* (2006.01)
(Continued)

(52) U.S. Cl.
CPC ............ *F16L 11/16* (2013.01); *C23F 13/08* (2013.01); *C23F 13/18* (2013.01); *F16L 11/08* (2013.01);
(Continued)

(58) Field of Classification Search
CPC .......... F16L 11/16; F16L 11/08; F16L 11/081; F16L 11/083; F16L 11/127; F16L 58/00; C23F 13/08; H01B 7/226; H01B 7/2806
(Continued)

(56) References Cited

U.S. PATENT DOCUMENTS 2,825,364 A * 3/1958 Cullen .................... E21B 17/20
                                                    138/132
3,578,029 A * 5/1971 Cullen .................... E21B 17/20
                                                    138/139
(Continued)

FOREIGN PATENT DOCUMENTS

CN      1420973      5/2003
CN     102758975    10/2012
(Continued)

OTHER PUBLICATIONS

International Search Report for Application No. PCT/GB2018/050700 dated Jul. 30, 2018.
(Continued)

*Primary Examiner* — James F Hook
(74) *Attorney, Agent, or Firm* — Knobbe Martens Olson and Bear, LLP

(57) ABSTRACT

Flexible pipe body, a flexible pipe and a method of manufacturing pipe body are disclosed. The flexible pipe body comprises a tensile armour layer and a supporting layer radially outside, or radially inside, and in an abutting relationship with the tensile armour layer. The supporting layer
(Continued)

comprises a helically wound constraining tape element and a helically wound electrically conductive tape element.

22 Claims, 13 Drawing Sheets

(51) Int. Cl.

| | | |
|---|---|---|
| F16L 11/08 | (2006.01) | |
| F16L 11/127 | (2006.01) | |
| F16L 58/00 | (2006.01) | |
| H01B 7/00 | (2006.01) | |
| H01B 7/02 | (2006.01) | |
| H01B 7/04 | (2006.01) | |
| H01B 7/18 | (2006.01) | |
| H01B 7/22 | (2006.01) | |
| H01B 7/28 | (2006.01) | |
| H01B 13/00 | (2006.01) | |
| H01B 13/08 | (2006.01) | |
| H01B 13/26 | (2006.01) | |
| C23F 13/08 | (2006.01) | |
| H01B 7/282 | (2006.01) | |
| C23F 13/18 | (2006.01) | |
| B21C 37/12 | (2006.01) | |

(52) U.S. Cl.
CPC .......... *F16L 11/081* (2013.01); *F16L 11/083* (2013.01); *F16L 11/127* (2013.01); *F16L 58/00* (2013.01); *H01B 7/0018* (2013.01); *H01B 7/0241* (2013.01); *H01B 7/045* (2013.01); *H01B 7/1875* (2013.01); *H01B 7/226* (2013.01); *H01B 7/2806* (2013.01); *H01B 7/2825* (2013.01); *H01B 13/0036* (2013.01); *H01B 13/08* (2013.01); *H01B 13/26* (2013.01); *B21C 37/12* (2013.01); *C23F 2213/32* (2013.01)

(58) Field of Classification Search
USPC .............. 138/129, 104, 130, 134, 135, 132
See application file for complete search history.

(56) References Cited

U.S. PATENT DOCUMENTS

| | | | | |
|---|---|---|---|---|
| 3,858,616 | A * | 1/1975 | Thiery | F16L 11/127 |
| | | | | 138/133 |
| 3,994,794 | A | 11/1976 | Bohne | |
| 4,241,763 | A * | 12/1980 | Antal | F16L 11/088 |
| | | | | 138/127 |
| 4,487,230 | A | 12/1984 | Anthony | |
| 4,706,713 | A | 11/1987 | Sadamitsu et al. | |
| 4,877,354 | A | 10/1989 | Williamson | |
| 5,117,874 | A * | 6/1992 | Ochiai | G02B 6/4459 |
| | | | | 138/140 |
| 5,294,396 | A | 3/1994 | Dressel et al. | |
| 6,012,495 | A | 1/2000 | Antonsen | |
| 6,039,083 | A | 3/2000 | Loper | |
| 6,165,586 | A * | 12/2000 | Nouveau | D07B 5/045 |
| | | | | 428/105 |
| 6,461,082 | B1 | 10/2002 | Smith | |
| 6,491,779 | B1 * | 12/2002 | Bryant | F16L 11/081 |
| | | | | 156/169 |
| 6,858,117 | B2 | 2/2005 | Berton et al. | |
| 7,055,551 | B2 | 6/2006 | Fraser et al. | |
| 9,151,418 | B2 | 10/2015 | Goering et al. | |
| 11,320,068 | B2 * | 5/2022 | Wang | H01B 7/226 |
| 2002/0017333 | A1 * | 2/2002 | Wellman | F16L 58/1009 |
| | | | | 138/146 |
| 2004/0025953 | A1 * | 2/2004 | Fraser | F16L 11/082 |
| | | | | 138/133 |
| 2004/0154677 | A1 | 8/2004 | Coutarel et al. | |
| 2004/0185202 | A1 * | 9/2004 | Glejbol | B32B 27/304 |
| | | | | 428/36.1 |
| 2005/0115623 | A1 | 6/2005 | Coutarel et al. | |
| 2005/0229991 | A1 * | 10/2005 | Hardy | F16L 11/16 |
| | | | | 138/133 |
| 2007/0227608 | A1 | 10/2007 | Dupoiron et al. | |
| 2008/0283138 | A1 * | 11/2008 | Rytter | F16L 11/083 |
| | | | | 138/135 |
| 2009/0084459 | A1 | 4/2009 | Williams | |
| 2010/0089481 | A1 | 4/2010 | Bectarte et al. | |
| 2010/0266789 | A1 | 10/2010 | Conley et al. | |
| 2012/0273080 | A1 | 11/2012 | Glejbol et al. | |
| 2012/0279577 | A1 | 11/2012 | Goering et al. | |
| 2013/0251457 | A1 | 9/2013 | Melymuk et al. | |
| 2013/0280973 | A1 | 10/2013 | Elder et al. | |
| 2014/0069542 | A1 | 3/2014 | Graham et al. | |
| 2014/0167346 | A1 | 6/2014 | Iijima | |
| 2014/0326357 | A1 * | 11/2014 | Graham | F16L 11/088 |
| | | | | 156/187 |
| 2015/0030295 | A1 * | 1/2015 | Do | G02B 6/4432 |
| | | | | 356/73.1 |
| 2015/0059908 | A1 * | 3/2015 | Mollen | B32B 27/40 |
| | | | | 138/132 |
| 2015/0260315 | A1 * | 9/2015 | Van Hooren | F16L 11/04 |
| | | | | 138/137 |
| 2016/0069486 | A1 | 3/2016 | Roberts et al. | |
| 2016/0107401 | A1 * | 4/2016 | Dodds | B29C 53/58 |
| | | | | 264/40.1 |
| 2016/0178106 | A1 | 6/2016 | Glejbøl | |
| 2020/0049280 | A1 | 2/2020 | Wang et al. | |
| 2020/0102658 | A1 | 4/2020 | Wang et al. | |

FOREIGN PATENT DOCUMENTS

| | | |
|---|---|---|
| CN | 104159723 | 11/2014 |
| CN | 203963298 | 11/2014 |
| CN | 106030178 | 10/2016 |
| EP | 0219472 | 5/1988 |
| EP | 2520839 | 9/2015 |
| FR | 2286331 | 4/1976 |
| FR | 2286334 | 5/1980 |
| GB | 2255104 | 7/1995 |
| GB | 2514785 | 12/2014 |
| GB | 2521864 | 7/2015 |
| WO | WO 00/22336 | 4/2000 |
| WO | WO 2002/039008 | 5/2002 |
| WO | WO 2011/072688 | 6/2011 |
| WO | WO 2014/167346 | 10/2014 |
| WO | WO 2015/097422 | 7/2015 |
| WO | WO 2016/000716 | 1/2016 |
| WO | WO 2016/110617 | 7/2016 |

OTHER PUBLICATIONS

GB Search Report for Application No. GB1704217.7 dated Sep. 19, 2017.
GB Search Report for Application No. GB1704214.4 dated Sep. 11, 2017.
A. Klust et al. "CO2 Corrosion Resistance of Steel Cord Reinforced Thermoplastic Materials For Flexible Pipe Systems", NACE International (2011).
International Preliminary Report on Patentability for International Application No. PCT/GB2018/050700 dated Sep. 17, 2019.

* cited by examiner

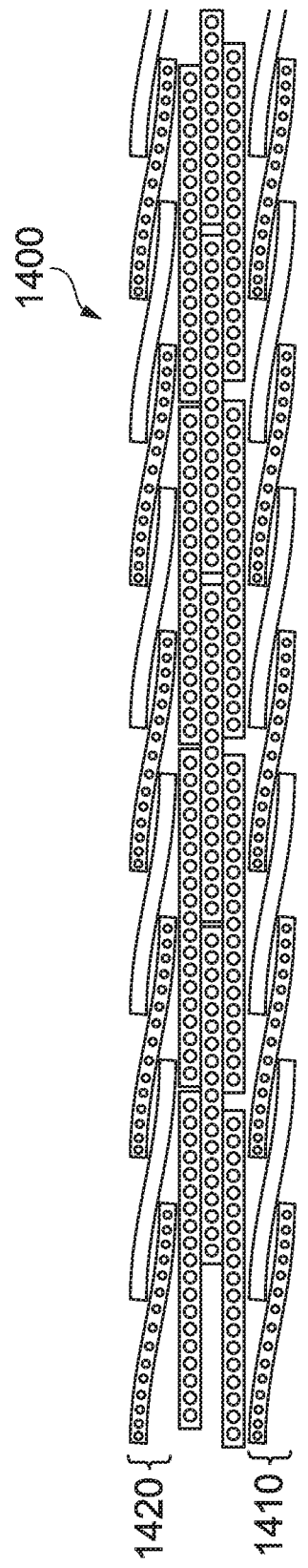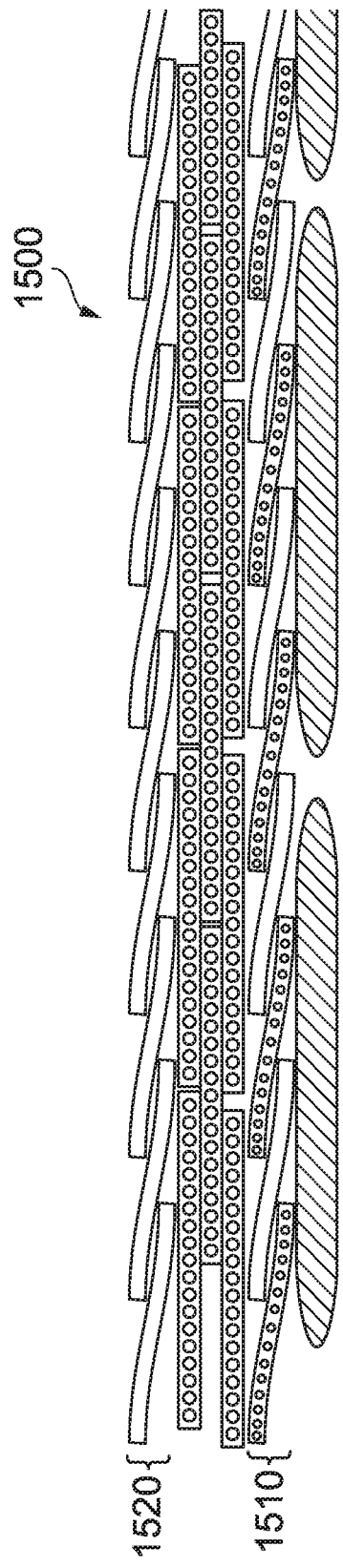

PROVISION OF ELECTRICAL CONTINUITY AND/OR RADIAL SUPPORT

The present invention relates to a method and apparatus for providing electrical continuity across and around tensile armour wires or other multi component metallic structures of a flexible pipe. In particular, but not exclusively, the present invention relates to flexible pipe body having a supporting layer over at least one tensile armour layer whereby the supporting layer electrically interconnects wires of the tensile armour layer to provide continuity therebetween and additionally provides a constraining effect on the wires to provide radial support to them.

Traditionally flexible pipe is utilised to transport production fluids, such as oil and/or gas and/or water, from one location to another. Flexible pipe is particularly useful in connecting a sub-sea location (which may be deep underwater, say 1000 metres or more) to a sea level location. The pipe may have an internal diameter of typically up to around 0.6 metres (e.g. diameters may range from 0.05 m up to 0.6 m). A flexible pipe is generally formed as an assembly of flexible pipe body and one or more end fittings. The pipe body is typically formed as a combination of layered materials that form a pressure-containing conduit. The pipe structure allows large deflections without causing bending stresses that impair the pipe's functionality over its lifetime. There are different types of flexible pipe such as unbonded flexible pipe which is manufactured in accordance with API 17J or composite type flexible pipe or the like. The pipe body is generally built up as a combined structure including polymer layers and/or composite layers and/or metallic layers. For example, pipe body may include polymer and metal layers, or polymer and composite layers, or polymer, metal and composite layers. Layers may be formed from a single piece such as an extruded tube or by helically winding one or more wires at a desired pitch or by connecting together multiple discrete hoops that are arranged concentrically side-by-side. Depending upon the layers of the flexible pipe used and the type of flexible pipe some of the pipe layers may be bonded together or remain unbonded.

Some flexible pipe has been used for deep water (less than 3,300 feet (1,005.84 metres)) and ultra-deep water (greater than 3,300 feet) developments. It is the increasing demand for oil which is causing exploration to occur at greater and greater depths (for example in excess of 8202 feet (2500 metres)) where environmental factors are more extreme. For example in such deep and ultra-deep water environments ocean floor temperature increases the risk of production fluids cooling to a temperature that may lead to pipe blockage. In practice flexible pipe conventionally is designed to perform at operating temperatures of −30° C. to +130° C., and is being developed for even more extreme temperatures. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from certain layers such as a pipe carcass or a pressure armour or a tensile armour layer of the flexible pipe body is increased. It is noted for the sake of completeness that flexible pipe may also be used for shallow water applications (for example less than around 500 metres depth) or even for shore (overland) applications.

It is known that an inner fluid retaining layer of a flexible pipe, often referred to as a liner or barrier layer, and an outer fluid retaining layer, referred to as an outer sheath, define between them an annulus region in which various metal structures may be located. For example such metal structures are tensile armour windings or pressure armour windings or the like. Furthermore it is known that if an outer sheath of a flexible pipe is breached in use or on installation ingress of seawater into the annulus region can lead to corrosion of the metallic parts. To prevent corrosion cathodic protection has been utilised. Cathodic protection is a mechanism for providing corrosion protection and such cathodic protection is well known to those skilled in the art. For example recommended practice DNV-RP-B401 or recommended practice DNV-RP-F103 provide guidelines for providing cathodic protection (CP) systems for submarine pipelines and flexible pipe risers. In summary such CP systems rely on the inclusion of metal anodes such as aluminium or zinc blocks which are less noble and thus have a lower reference potential than the metallic regions of a flexible pipe which are to be protected. At a point of contact where an anode is located the flexible pipe metals, such as steel windings, will have the potential of the anode. This potential gradually increases along a length of flexible pipe body away from the anode. The change in potential is caused by attenuation effects due to the resistance of the structure of the metal elements as well as other factors.

Because of these well known attenuation effects, and the fact that anodes used as part of a CP system have conventionally been mounted to end fittings of a flexible pipe, an effective length of flexible pipe body between next adjacent end fittings has been limited. Effectively more end fittings have conventionally been utilised than desired in order to provide anodes, fitted to the end fittings, at a required level of frequency along a pipeline. This requirement to include "extra" end fittings along a flexible pipe has conventionally increased cost and complexity associated with the provision of a subsea pipeline and/or riser.

It is also known that from time to time it is desirable to be able to attach ancillary equipment to a flexible pipe at desired locations along a length of the flexible pipe on installation or during use. A wide variety of ancillary equipment could in theory be needed. For example, buoyancy modules, bend restrictors, anode clamps, riser clamps, stiffener elements or the like. Conventional techniques for mounting such equipment are limited and often rely upon attachment of such ancillary equipment to a rigid end fitting at an end of a pipe. Alternatively certain conventional techniques require complex and costly and difficult to install securing mechanisms which additionally may provide a risk to proper functioning of a flexible pipe.

A key challenge with conventional techniques is to ensure that there is continuity across and around the tensile armour wires which form any tensile armour layer in flexible pipe body. Conventionally tensile armour wires are wound around an underlying layer in counter-wound helices to provide tensile strength to a resultant flexible pipe and in part helping to contribute to pressure containment. To protect these wires, which are typically carbon steel or some other such metal, from corrosion anodes are applied to a pipe. These must be in electrical connection with each and every wire in a tensile armour layer to help protect them. Thus it is important that electrical connectivity/continuity is made between all of the wires forming a tensile armour layer. In practice this can be inhibited according to conventional techniques since the wires forming a tensile armour layer may have gaps between them when a pipe is in a neutral state and, depending upon manufacturing techniques, local polymer layers can creep into gaps between adjacent wires and effectively tend to separate them in use. This causes a problem with conventional techniques in that cathodic protection systems may not adequately protect any or each tensile armour wire in a tensile armour layer. To a lesser extent this is likewise a problem with windings of a pressure armour layer.

Certain other conventional techniques for forming and using flexible pipe can suffer from the problem that water ingress through an outer sheath, caused by accidental rupture, can cause degradation to certain types of fibres or wire within the space between the outer sheath and an inner fluid retaining layer.

It is an aim of certain embodiments of the present invention to at least partly mitigate the above-mentioned problems.

It is an aim of certain embodiments of the present invention to help interconnect and thus provide continuity between the multiple wires which are used to form a tensile armour and/or pressure armour layer in flexible pipe body.

It is an aim of certain embodiments of the present invention to provide continuity between tensile armour wires that form a tensile armour layer and which can also help provide anti-birdcaging effect.

It is an aim of certain embodiments of the present invention to provide a supporting layer formed as a single layer or multiple sub layers which can simultaneously provide electrical conductive properties to interconnect adjacent electrically conductive components and which also provide radial support to help prevent buckling of component parts of a flexible pipe in use.

It is an aim of certain embodiments of the present invention to help provide a shielding layer to help prevent or reduce water ingress and thus water degradation of metallic elements in a flexible pipe annulus when an outer sheath of a flexible pipe is breached.

It is an aim of certain embodiments of the present invention to provide a mechanism for obviating attenuation effects from a cathodic protection system along a length of flexible pipe.

It is an aim of certain embodiments of the present invention to enable cathodic anodes to be secured to an outer sheath of a flexible pipe at locations well away from distant end fittings.

It is an aim of certain embodiments of the present invention to provide an electrical connection between layers of a flexible pipe which include metallic components.

It is an aim of certain embodiments of the present invention to provide an anti-fretting layer between opposed layers of a flexible pipe which thus provides a stand-off to the opposed layers but which also helps maintain metallic parts in the spaced apart layers in electrical connection.

It is an aim of certain embodiments of the present invention to reduce attenuation effects along a length of flexible pipe body.

According to a first aspect of the present invention there is provided flexible pipe body for transporting production fluids, comprising:
 a first tensile armour layer; and
 a first supporting layer radially outside, or radially inside, and in an abutting relationship with the first tensile armour layer; wherein
 the first supporting layer comprises a helically wound constraining tape element and a helically wound electrically conductive tape element.

Aptly the flexible pipe body further comprises the first supporting layer comprises a single layer or a plurality of sub layers.

Aptly the flexible pipe body further comprises said a single layer or at least one of the plurality of sub layers comprises windings of the electrically conductive tape element interposed with windings of the constraining tape element in the supporting layer.

Aptly the flexible pipe body further comprises said plurality of sub layers comprises a first sub layer comprising at least one helically wound constraining tape element and a further sub layer comprising at least one helically wound electrically conductive tape element.

Aptly the flexible pipe body further comprises the further sub layer abuts the first tensile armour layer.

Aptly the flexible pipe body further comprises the at least one helically wound constraining tape element comprises a single helically wound constraining tape element that includes windings that overlap by 0 to 80%.

Aptly the flexible pipe body further comprises the at least one helically wound constraining tape element comprises a plurality of constraining tape elements that include windings that overlap by 0 to 90%.

Aptly the flexible pipe body further comprises the at least one helically wound electrically conductive tape element comprises a single helically wound electrically conductive tape element that includes windings that overlap by 0 to 80%.

Aptly the flexible pipe body further comprises the at least one helically wound electrically conductive tape element comprises a plurality of electrically conductive tape elements that include windings that overlap by 0 to 90%.

Aptly the flexible pipe body further comprises the at least one helically wound electrically conductive tape element comprises one or more helically wound electrically conductive tape elements interposed between corresponding windings of a non-electrically conducting tape element.

Aptly the flexible pipe body further comprises the non-electrically conductive tape element is an insulating tape element and/or a constraining tape element.

Aptly the flexible pipe body further comprises at least one still further sub layer between the first and further sub layers, each still further sub layer comprising a layer of interposed constraining tape element and electrically conductive tape element windings or a layer comprising a constraining tape element winding only or a layer comprising electrically conductive tape element windings only.

Aptly the flexible pipe body further comprises the constraining tape element comprises a tape element that, when wound over an underlying layer, constrains radially outward movement of wires of the underlying layer thereby providing radial support.

Aptly the constraining tape element comprises a high strength elongate tape, wherein the ratio of thickness to width of that tape is at least 1:5 and optionally at least 1:10 and optionally at least 1:100 and optionally 1:150 or 1:200 or 1:1000.

Aptly the flexible pipe body further comprises the supporting layer comprises at least one of a polymer tape and/or a fibre reinforced tape and/or a wire, or wire strand reinforced tape, wherein the fibre reinforced tape has a strength of at least 500 MPa when measured at 60° C. according to ISO527-3 or ISO6892-2 or ASTM D3039 (as relevant for the material) and using a test speed of 350 mm/minute, and aptly retains a strength of at least 500 MPa when measured at 90° C. according to ISO527-3 or ISO6892-2 or ASTM D3039 (as relevant for the material) and using a test speed of 350 mm/minute.

Aptly the flexible pipe body further comprises the fibre reinforced tape is a tape reinforced with one or more glass and/or carbon and/or basalt and/or aramid and/or polyester fibres and/or wires and/or wire strands, comprising fibre or wire diameters in the range 0.001-1 mm.

Aptly the flexible pipe body further comprises the fibre reinforced tape reinforced with one or more glass and/or carbon and/or basalt and/or aramid and/or polyester fibres and/or wires and/or wire strands comprises fibres and/or wires and/or wire strands predominantly aligned in the length direction of the tape.

Aptly the flexible pipe body further comprises the fibre reinforced tape comprises a lesser proportion of fibres in a direction substantially different from the length direction of the tape, and optionally a lesser proportion of fibres are aligned at an angle at least 30° from the length direction of the tape, optionally at an angle at 90° to the length direction of the tape.

Aptly the flexible pipe body further comprises the constraining tape element is windable under tension and remains in tension subsequent to being helically wound.

Aptly the flexible pipe body further comprises the constraining tape element does not experience strain beyond 3% due to tension while being helically wound around the flexible pipe body, and optionally the constraining tape element does not experience strain beyond 2% due to tension while being helically wound around the flexible pipe body, and optionally the constraining tape element does not experience strain beyond 0.5% due to tension while being helically wound around the flexible pipe body.

Aptly the flexible pipe further comprises the conductive tape element comprises a polymer dosed with a conductive filler material, optionally selected from: copper, aluminium, magnesium, silver, titanium, iron, carbon, graphite, or graphene (as defined and differentiated from graphite by ISO/TS 80004-13:2017).

Aptly the flexible pipe body further comprises the conductive tape element comprises a metal tape or film of thickness between 0.005 mm and 2 mm, and optionally of thickness between 0.05 mm and 0.5 mm.

Aptly the flexible pipe body further comprises the conductive tape element comprises a metal woven band comprising metal wires of thickness between 0.005 mm and 1 mm, and optionally of thickness between 0.01 mm and 0.5 mm.

Aptly the flexible pipe body further comprises the first tensile armour layer comprises a layer of helically wound wires wound at a lay angle of about 10 degrees to 55 degrees with respect to a primary longitudinal axis of the pipe body.

Aptly the flexible pipe body further comprises a further tensile armour layer, wherein the first tensile armour layer is a radially inner or a radially outer tensile armour layer with respect to the further tensile armour layer.

Aptly the flexible pipe body further comprises the first tensile armour layer comprises an outer tensile armour layer.

Aptly the flexible pipe body further comprises a further supporting layer, comprising a helically wound constraining tape element and a helically wound electrically conductive tape element, wound radially outside and adjacent to the further tensile armour layer.

Aptly the flexible pipe body further comprises a still further supporting layer, comprising a helically wound constraining tape element and a helically wound electrically conductive tape element; wherein the first supporting layer, further supporting layer and the still further supporting layer are interdigitated with the first and further tensile armour layers.

Aptly the flexible pipe body further comprises each winding of the electrically conductive tape element in a supporting layer wraps helically around an underlying layer and is disposed in an abutting relationship with an outer surface of a tensile armour layer, provided by a surface of each tensile armour wire of the tensile armour layer, wherein the electrically conductive layer contacts at least a plurality of tensile armour wires in the tensile armour layer thereby electrically connecting multiple tensile armour wires to provide electrical continuity therebetween.

Aptly the flexible pipe body further comprises a fluid retaining polymer layer radially inside the first tensile armour layer; and an outer sheath radially outside of the first tensile armour layer.

According to a second aspect of the present invention there is provided flexible pipe for transporting production fluids, comprising:

the flexible pipe body as described in the first aspect; and
at least one end fitting terminating a respective end of the flexible pipe body.

Aptly the flexible pipe further comprises a corrosion protection system.

Aptly the flexible pipe, further comprises the flexible pipe body comprises at least one anode element distal to each end fitting and the flexible pipe body has a length in excess of 2000 metres.

According to a third aspect of the present invention there is provided a method of providing electrical continuity between tensile armour wires in a tensile armour layer, comprising the steps of:

providing a first tensile armour layer by helically winding a plurality of tensile armour wires over an underlying layer; and providing a first supporting layer in an abutting relationship with the first tensile armour layer by helically winding a constraining tape element simultaneously with an electrically conductive tape element; whereby the wound electrically conductive tape element makes electrical contact with and thereby electrically connects multiple tensile armour wires in the first tensile armour layer.

Aptly the method further comprises winding the constraining tape element and electrically conductive tape element of the first supporting layer to thereby interpose windings of the constraining tape element with windings of the electrically conductive tape element.

Aptly the method further comprises winding the first supporting layer and subsequently providing the first tensile armour layer over the first supporting layer, said first supporting layer thereby providing said an underlying layer.

Aptly the method further comprises providing the first tensile armour layer and subsequently providing the first supporting layer over the first tensile armour layer.

Aptly the method further comprises providing the first supporting layer as a single layer comprising windings of the electrically conductive tape element and the constraining tape element or as a plurality of sub layers.

Aptly the method further comprises providing the sub layers by providing a first sub layer comprising at least one helically wound constraining tape element or at least one helically wound insulating tape element or at least one helically wound electrically conductive tape element and a further sub layer comprising at least one helically wound electrically conductive tape element and a helically wound constraining tape element wound in an interposed arrangement with the electrically conductive tape element.

Aptly the method further comprises providing the further sub layer in an abutting relationship with the first tensile armour layer.

Aptly the method further comprises as the electrically conductive tape is wound with the constraining tape simultaneously providing electrical continuity and radial support to wires of an underlying tensile armour layer.

Aptly the method further comprises winding the constraining tape element comprises winding a tape that constrains radially outward movement of wires of an underlying layer.

Aptly the method further comprises winding the constraining tape element comprises winding at least one of a polymer tape and/or a fibre reinforced tape and/or a wire, or wire strand, reinforced tape with the electrically conductive tape element over the first tensile armour layer.

Aptly the method further comprises winding a further tensile armour layer over the first tensile armour layer or winding tensile armour wires, to provide the first tensile armour layer, over an underlying layer that comprises a further tensile armour layer comprising a further plurality of tensile armour wires or over a further supporting layer over the further tensile armour layer.

Aptly the method further comprises winding the electrically conductive tape by helically winding a metal tape.

According to a fourth aspect of the present invention there is provided flexible pipe body for transporting production fluids, comprising:
 a first armour layer formed from a helical winding of a metal tape element;
 a further armour layer formed from a helical winding of a further metal tape element; and
 at least one intermediate layer between the first and further armour layers, said intermediate layer comprising a helically wound electrically insulating tape element and a helically wound electrically conductive tape element.

Aptly windings of the electrically insulating tape element are interposed with windings of the electrically conductive tape element in the intermediate layer.

Aptly the first armour layer comprises a pressure armour layer and the further armour layer comprises a tensile armour layer.

Aptly the first armour layer comprises an inner tensile armour layer and the further armour layer comprises an outer tensile armour layer.

Aptly the flexible pipe body further comprises a further intermediate layer between one of the first and further armour layers and a still further armour layer formed from a helical winding of a still further metal tape element, said further intermediate layer comprising a helically wound electrically insulating tape element and a helically wound electrically conducting tape element.

Aptly windings of the electrically insulating tape element in the further intermediate layer are interposed with windings of the electrically conducting tape element in the further intermediate layer.

Aptly each winding of the electrically conductive tape element in an intermediate layer bridges and thereby electrically connects metallic windings of an underlying armour layer with metallic windings of an overlying armour layer.

Aptly each winding of the electrically insulating tape element in an intermediate layer is wound tightly over an underlying layer to provide radial support to said an underlying layer.

Aptly the flexible pipe body further comprises a fluid retaining polymer layer and an outer sheath.

According to a fifth aspect of the present invention there is provided a flexible pipe for transporting production fluids comprising flexible pipe body that comprises a first armour layer formed from a helical winding of a metal tape element, a further armour layer formed from a helical winding of a further metal tape element and at least one intermediate layer between the first and further armour layers, said intermediate layer comprising a helically wound electrically insulating tape element and a helically wound electrically conductive tape element; and at least one end fitting terminating a respective end of the flexible pipe body.

Aptly the flexible pipe further comprises a corrosion protection system.

Aptly the flexible pipe body comprises at least one anode element distal to each said end fitting and the flexible pipe body has a length in excess of 2,000 meters.

According to a sixth aspect of the present invention there is provided a method of providing electrical continuity between adjacent layers of a flexible pipe, comprising the steps of:
 winding an intermediate layer over a first layer; and
 providing a further layer over the intermediate layer;
whereby said step of winding the intermediate layer comprises helically winding at least one electrically insulating tape element simultaneously with an electrically conductive tape element over the first armour layer.

Aptly the method further comprises winding the insulating tape element and electrically conductive tape element to thereby interpose windings of the insulating tape element with windings of the conductive tape element.

Aptly the method further comprises providing the first layer as a first armour layer by helically winding a metal tape element over an underlying layer.

Aptly the method further comprises winding the intermediate layer between a pressure armour layer and a tensile armour layer.

Aptly the method further comprises winding said an intermediate layer between an inner tensile armour layer and an outer tensile armour layer.

Certain embodiments of the present invention provide a supporting layer in an abutting relationship next to a tensile armour layer. The supporting layer includes component parts which help form electrical conductivity between adjacent tensile armour wires of the tensile armour layer and also includes component parts which can help constrain radial movement of the tensile armour wires.

Certain embodiments of the present invention can be used next to a pressure armour layer or other flexible body layer that includes multiple electrically conductive elements that should be electrically connected.

Certain embodiments of the present invention thus provide the advantage that a supporting layer can simultaneously provide enhanced continuity between tensile armour wires in an adjacent tensile armour wire layer and constrain radial movement of those wires to help provide radial support which can help provide anti-birdcaging properties.

Certain embodiments of the present invention provide electrical continuity between and around all of the wires of a layer of tensile armour in a flexible pipe. This can be achieved through the integration of a conducting tape with an anti-birdcaging tape whilst ensuring that the conducting tape is at least partly in contact with tensile armour wires of the tensile armour layer against which the tapes are opposed.

Certain embodiments of the present invention utilise a supporting layer which includes metallic tapes that can help provide shielding from water degradation to the reinforcing fibres of an anti-birdcaging tape or for tensile armour wires of a tensile armour layer. This can help prevent corrosive attack by contact with water over a service life.

Certain embodiments of the present invention utilise a conducting tape to help ensure that a cathodic protection system is effective for protection of all tensile armour wires in a tensile armour layer of flexible pipe body without compromising the provision of anti-birdcaging tape for the purpose of preventing buckling of those same tensile armour wires.

Certain embodiments of the present invention provide a method of effectively electrically connecting metallic elements from multiple layers in flexible pipe body together. As a result resistance along a length of flexible pipe is reduced thus reducing attenuation effects.

Certain embodiments of the present invention provide an anti-fretting layer that can be used between opposed layer in flexible pipe body and which also includes one or more electrically conducting elements which bridge the space between the separated layers to help provide an electrical connection at repeated locations along the length of flexible pipe body.

Certain embodiments of the present invention will now be described hereinafter, by way of example only, with reference to the accompanying drawings in which.

Figure 4A:
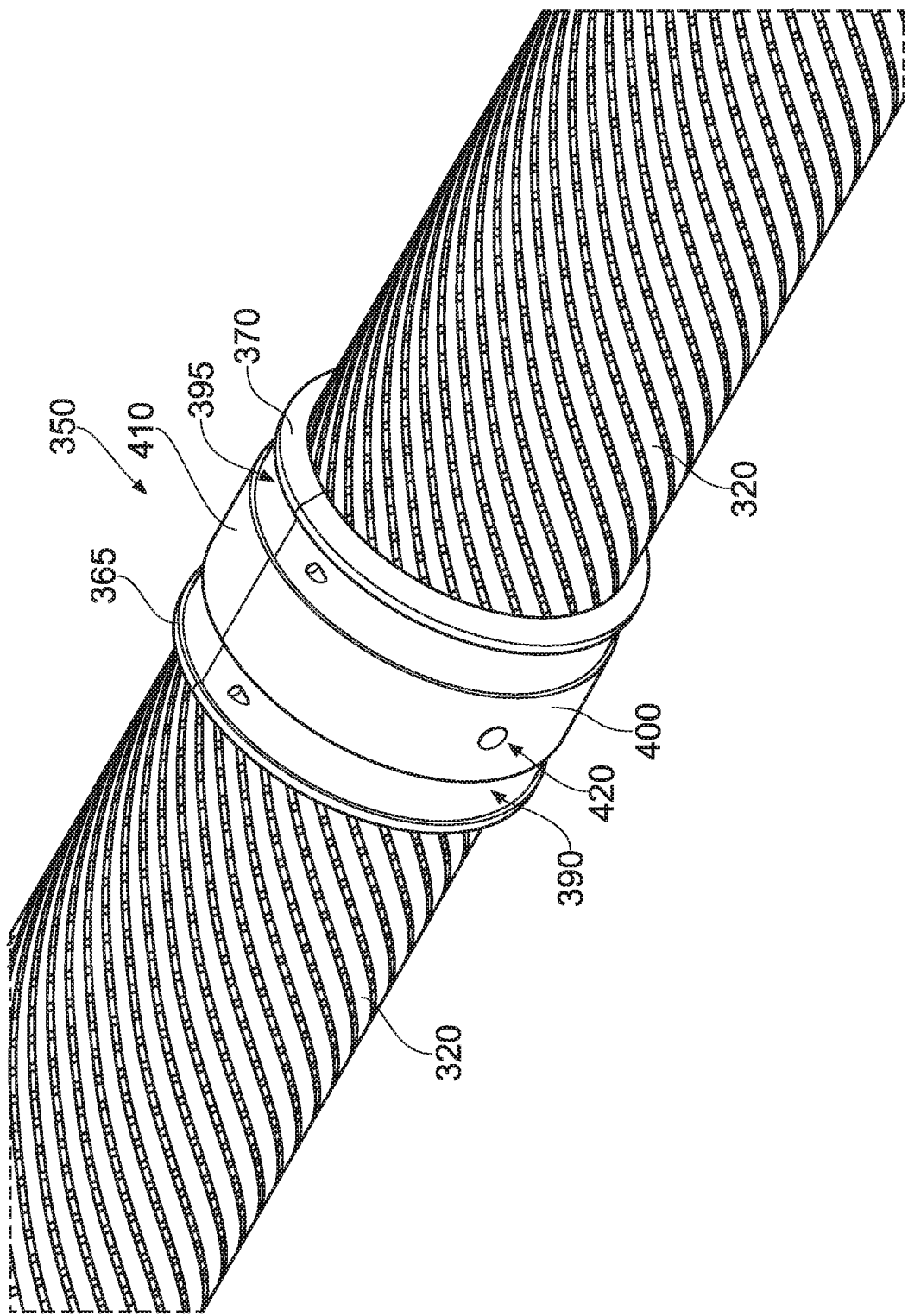
Figure 4B:
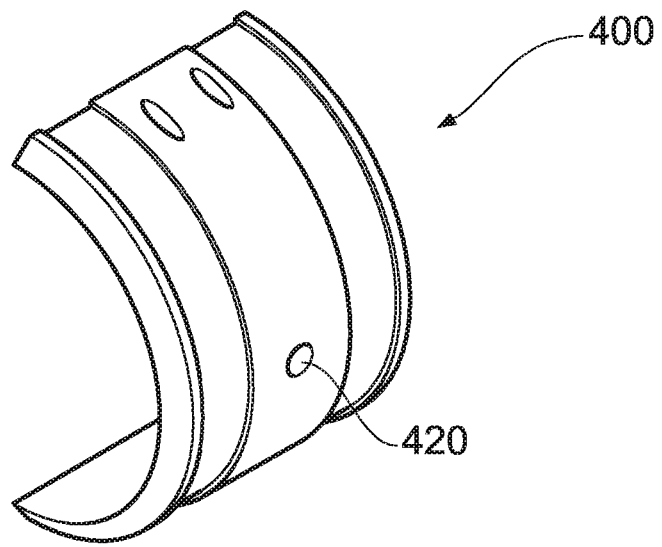
Figure 5:
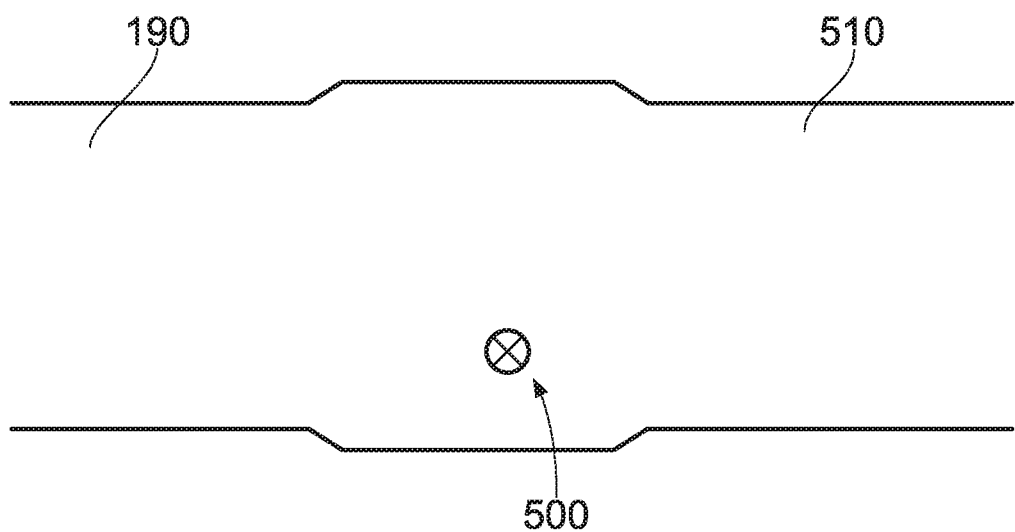
Figure 6:
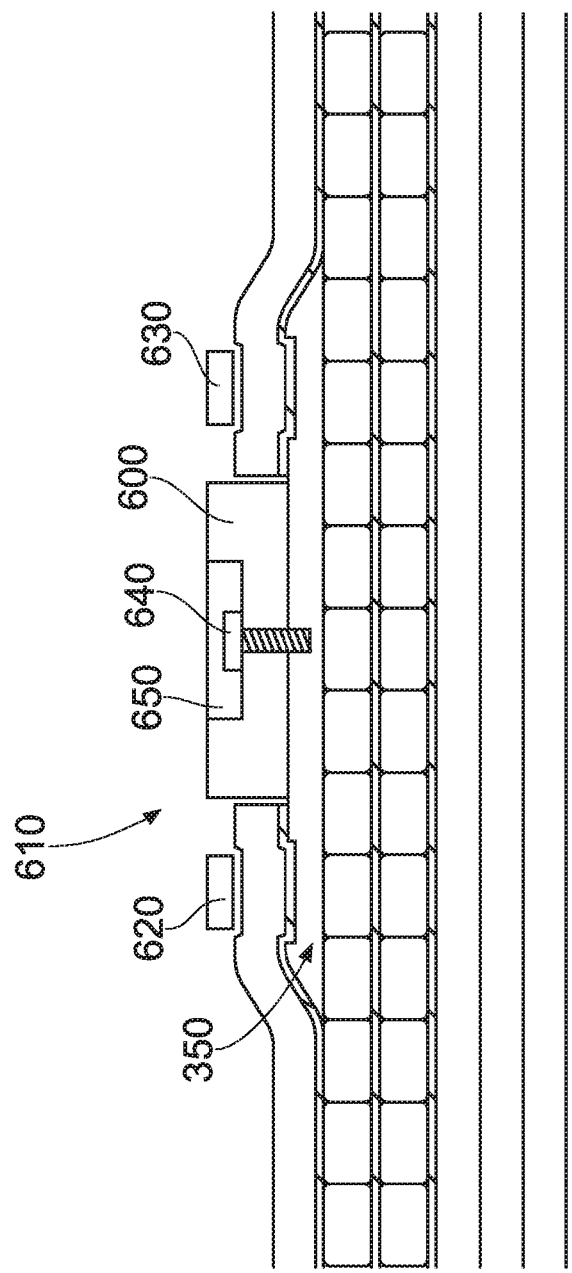

FIGS. 4A and 4B help illustrate apparatus for mounting a corrosion protection element over an outer surface of a tensile armour layer;

FIG. 5 illustrates an indicator showing a location of a fastening/securing point;

FIG. 6 illustrates an anode clamp secured to the flexible pipe body.

Figure 7:
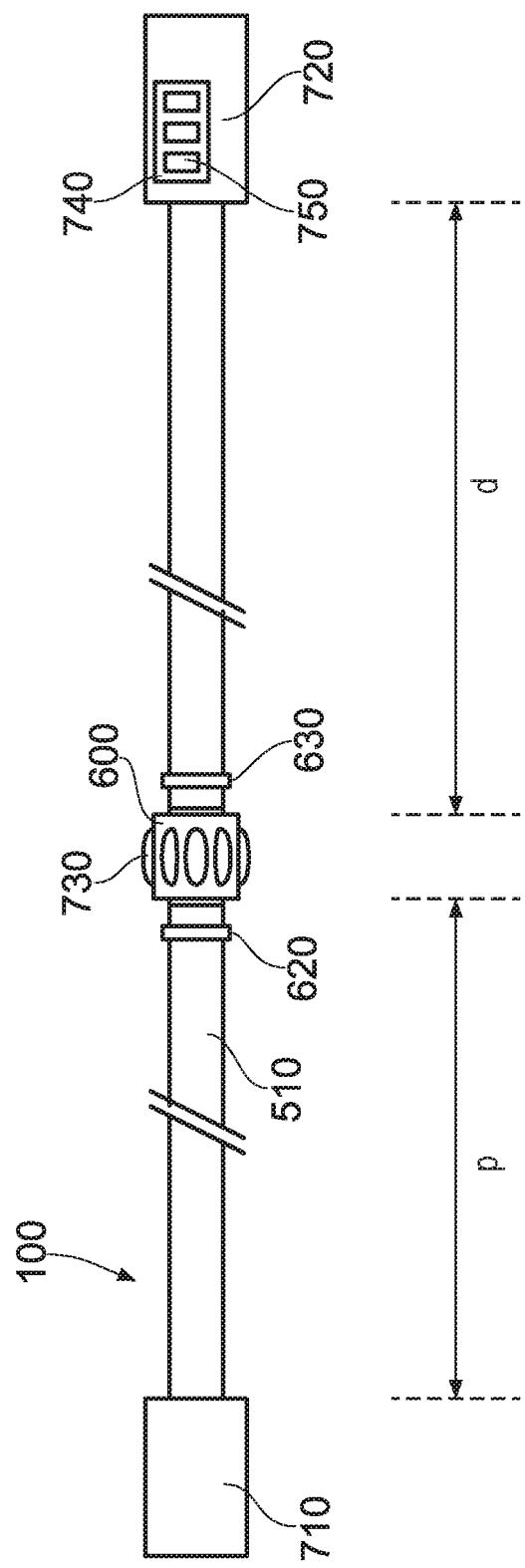
Figure 8:
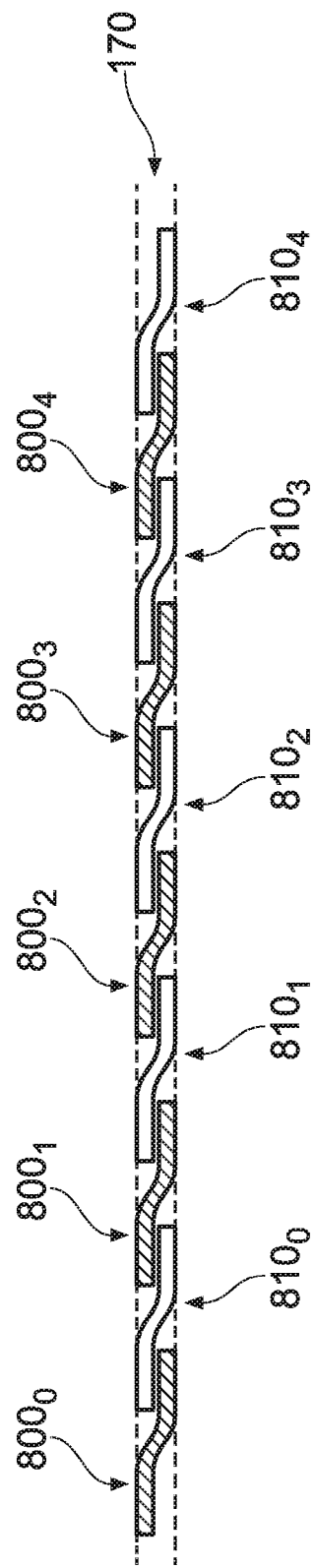
Figure 9:
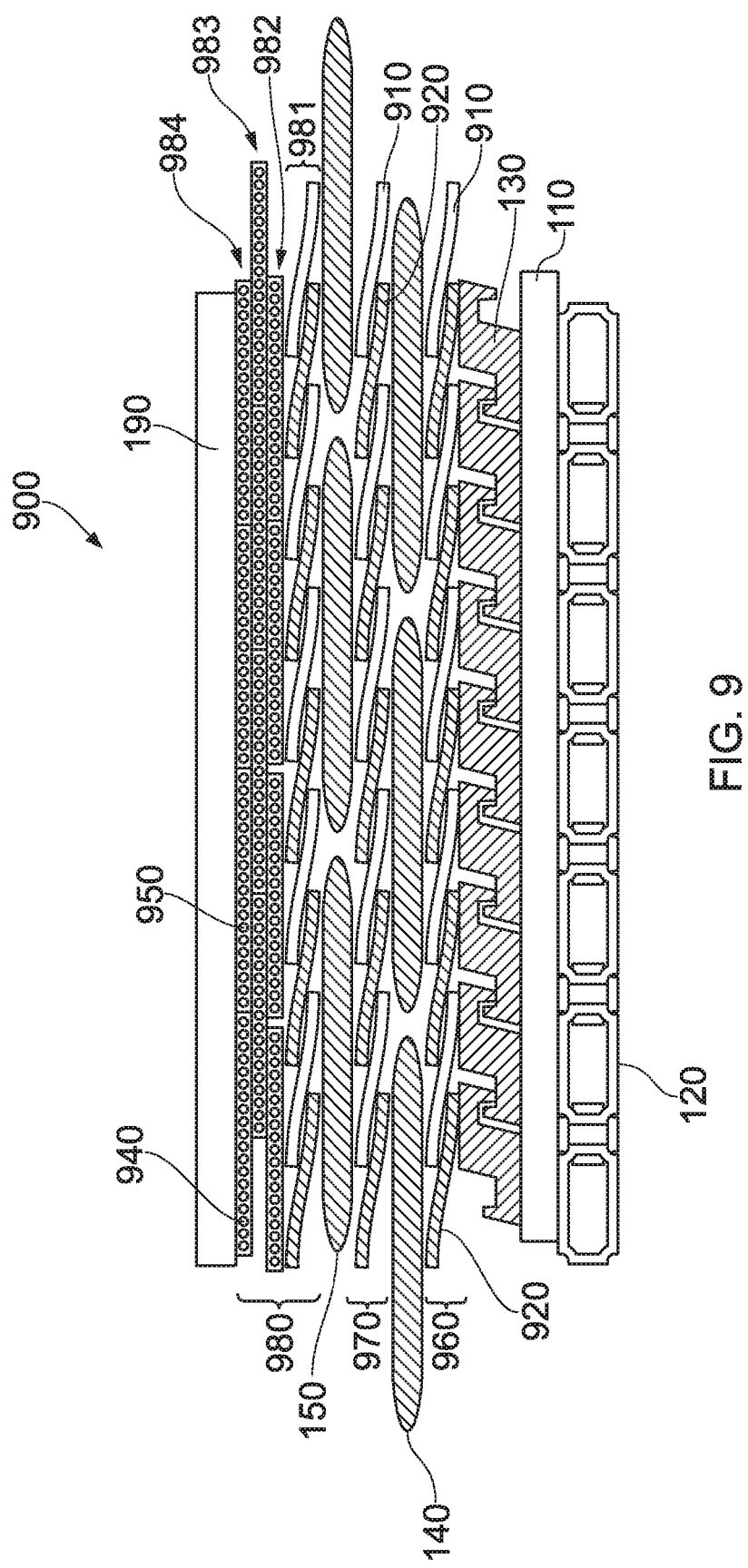
Figure 10:
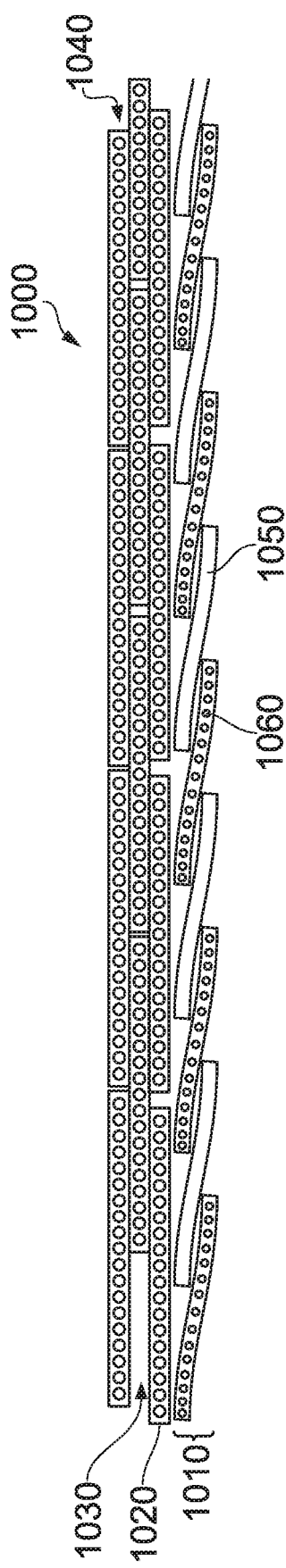
Figure 11:
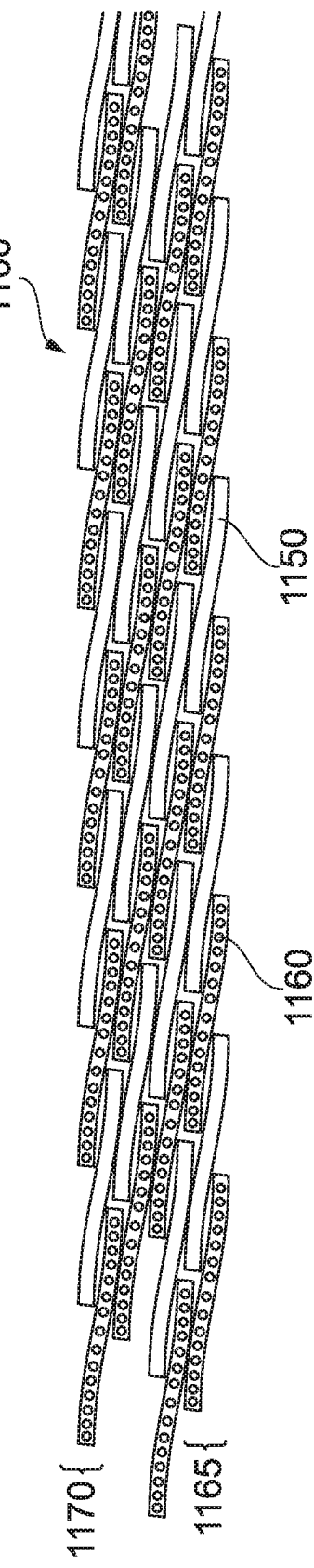
Figure 12:
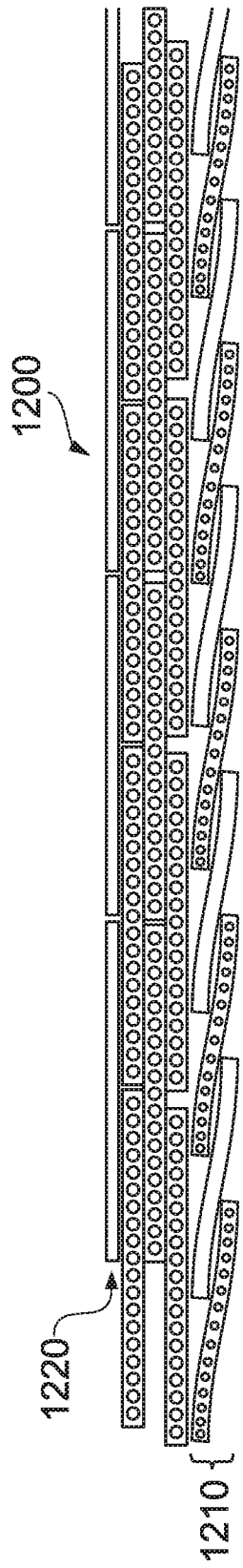
Figure 13:
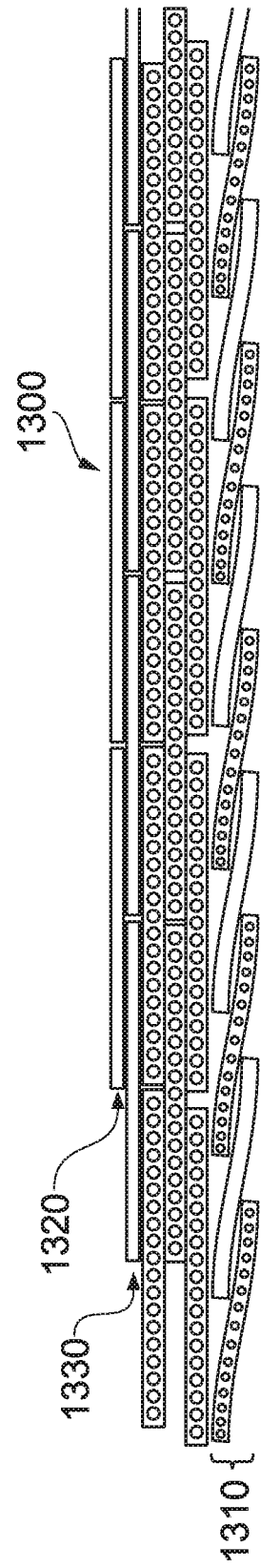

FIG. 7 illustrates a flexible pipe with cathodic protection provided by anodes mounted on an anode mount a great distance from opposed end fittings of the flexible pipe;

FIG. 8 illustrates an intermediate layer provided by both electronically conducting and electrically insulating tapes;

FIG. 9 illustrates a flexible pipe body structure with three supporting layers;

FIG. 10 illustrates an alternative supporting layer;

FIG. 11 illustrates an alternative supporting layer;

FIG. 12 illustrates an alternative supporting layer;

FIG. 13 illustrates an alternative supporting layer;

FIG. 14 illustrates an alternative supporting layer; and

FIG. 15 illustrates an alternative supporting layer with an adjacent tensile armour layer.

In the drawings like reference numerals refer to like parts.

Throughout this description, reference will be made to a flexible pipe. It is to be appreciated that certain embodiments of the present invention are applicable to use with a wide variety of flexible pipe. For example certain embodiments of the present invention can be used with respect to flexible pipe and associated end fittings of the type which is manufactured according to API 17J. Such flexible pipe is often referred to as unbonded flexible pipe. Other embodiments are associated with other types of flexible pipe.

Figure 1:
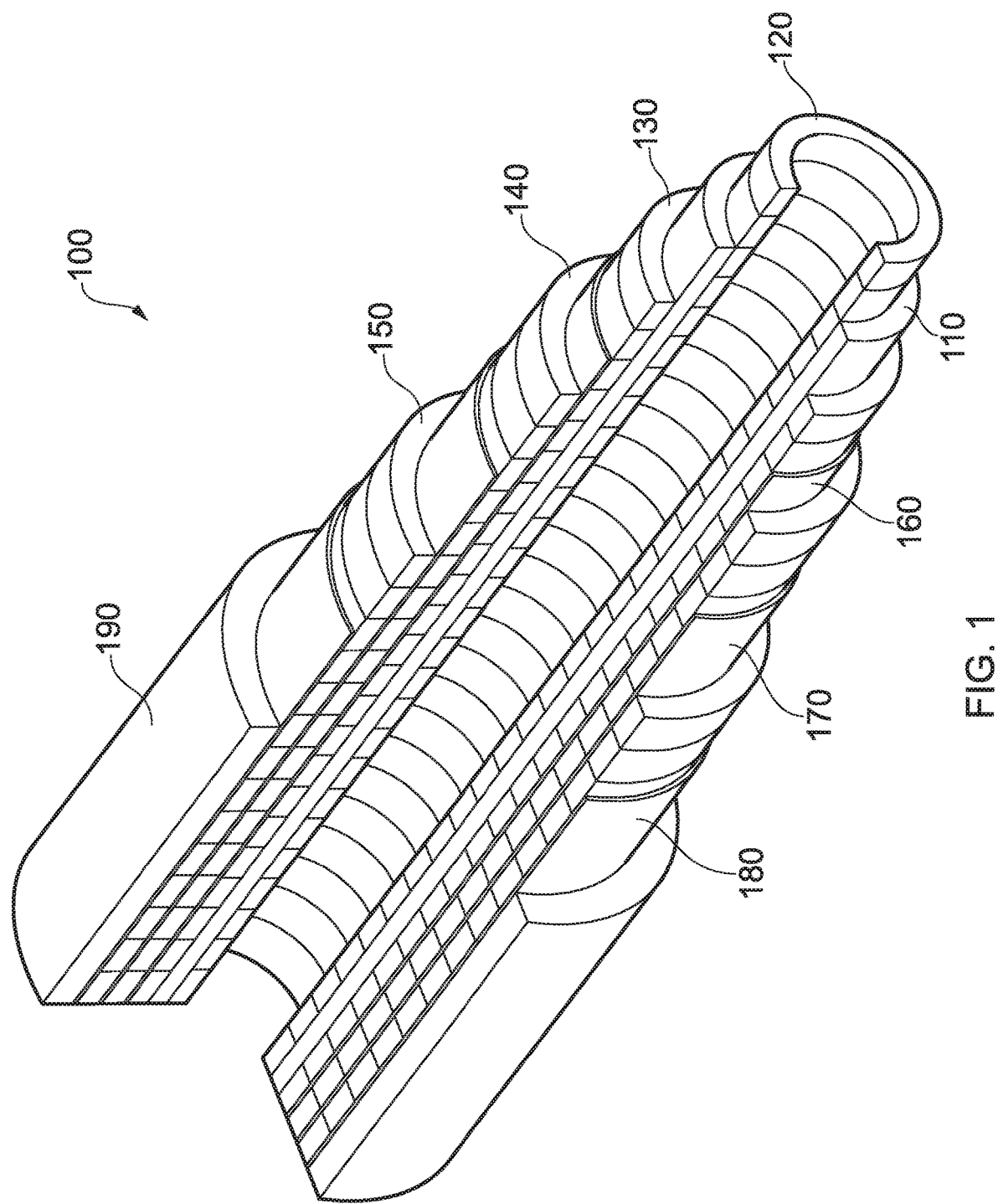
FIG. 1 illustrates flexible pipe body.

Turning to FIG. 1 it will be understood that the illustrated flexible pipe is an assembly of a portion of pipe body and one or more end fittings (not shown in FIG. 1) in each of which a respective end of the pipe body is terminated. FIG. 1 illustrates how pipe body 100 is formed from a combination of layered materials that form a pressure-containing conduit. As noted above although a number of particular layers are illustrated in FIG. 1, it is to be understood that certain embodiments of the present invention are broadly applicable to coaxial pipe body structures including two or more layers manufactured from a variety of possible materials. The pipe body may include one or more layers comprising composite materials, forming a tubular composite layer. It is to be further noted that the layer thicknesses are shown for illustrative purposes only. As used herein, the term "composite" is used to broadly refer to a material that is formed from two or more different materials, for example a material formed from a matrix material and reinforcement fibres.

A tubular composite layer is thus a layer having a generally tubular shape formed of composite material. Alternatively a tubular composite layer is a layer having a generally tubular shape formed from multiple components one or more of which is formed of a composite material. The layer or any element of the composite layer may be manufactured via an extrusion, pultrusion or deposition process or, by a winding process in which adjacent windings of tape which themselves have a composite structure are consolidated together with adjacent windings. The composite material, regardless of manufacturing technique used, may optionally include a matrix or body of material having a first characteristic in which further elements having different physical characteristics are embedded. That is to say elongate fibres which are aligned to some extent or smaller fibres randomly orientated can be set into a main body or spheres or other regular or irregular shaped particles can be embedded in a matrix material, or a combination of more than one of the above. Aptly the matrix material is a thermoplastic material, aptly the thermoplastic material is polyethylene or polypropylene or nylon or PVC or PVDF or PFA or PEEK or PTFE or alloys of such materials with reinforcing fibres manufactured from one or more of glass, ceramic, basalt, carbon, carbon nanotubes, polyester, nylon, aramid, steel, nickel alloy, titanium alloy, aluminium alloy or the like or fillers manufactured from glass, ceramic, carbon, metals, buckminsterfullerenes, graphene, metal silicates, carbides, carbonates, oxides or the like.

The pipe body 100 illustrated in FIG. 1 includes an internal pressure sheath 110 which acts as a fluid retaining layer and comprises a polymer layer that ensures internal fluid integrity. The layer provides a boundary for any conveyed fluid. It is to be understood that this layer may itself comprise a number of sub-layers. It will be appreciated that when a carcass layer 120 is utilised the internal pressure sheath is often referred to by those skilled in the art as a barrier layer. In operation without such a carcass (so-called smooth bore operation) the internal pressure sheath may be referred to as a liner. A barrier layer 110 is illustrated in FIG. 1.

It is noted that a carcass layer 120 is a pressure resistant layer that provides an interlocked construction that can be used as the innermost layer to prevent, totally or partially, collapse of the internal pressure sheath 110 due to pipe decompression, external pressure, and tensile armour pressure and mechanical crushing loads. The carcass is a crush resistant layer. It will be appreciated that certain embodiments of the present invention are thus applicable to 'rough bore' applications (with a carcass). Aptly the carcass layer is a metallic layer. Aptly the carcass layer is formed from stainless steel, corrosion resistant nickel alloy or the like. Aptly the carcass layer is formed from a composite, polymer, or other material, or a combination of materials and components. A carcass layer is radially positioned within the barrier layer.

A pressure armour layer 130 is a pressure resistant layer that provides a structural layer that increases the resistance of the flexible pipe to internal and external pressure and mechanical crushing loads. The layer also structurally supports the internal pressure sheath. Aptly as illustrated in FIG. 1 the pressure armour layer is formed as a tubular layer. Aptly for unbonded type flexible pipe the pressure armour layer consists of an interlocked construction of wires with a lay angle close to 90°. Aptly the lay angle is between 80° and 90° to the axis of the pipe body. Aptly in this case the pressure armour layer is a metallic layer. Aptly the pressure armour layer is formed from carbon steel, aluminium alloy or the like. Aptly the pressure armour layer is formed from a pultruded composite interlocking layer. Aptly the pressure armour layer is formed from a composite formed by extrusion or pultrusion or deposition or winding, followed by consolidation. A pressure armour layer is positioned radially outside an underlying barrier layer.

The flexible pipe body also includes a first tensile armour layer 140 and second tensile armour layer 150. Each tensile armour layer is used to sustain tensile loads and optionally also internal pressure. Aptly for some flexible pipes the tensile armour windings are metal (for example steel, stainless steel or titanium or the like). For some composite flexible pipes the tensile armour windings may be polymer composite tape windings (for example provided with either thermoplastic, for instance nylon, matrix composite or thermoset, for instance epoxy, matrix composite). For unbonded flexible pipe the tensile armour layer is typically formed from a plurality of wires. (To impart strength to the layer) that are located over an inner layer and are helically wound along the length of the pipe at a lay angle typically between about 10° to 55°. Aptly the tensile armour layers are counter-wound in pairs. Aptly the tensile armour layers are metallic layers. Aptly the tensile armour layers are formed from carbon steel, stainless steel, titanium alloy, aluminium alloy or the like. Aptly the tensile armour layers are formed from a composite, polymer, or other material, or a combination of materials.

Aptly the flexible pipe body includes optional layers of tape 160, 170, 180 which help contain underlying layers and to some extent prevent abrasion between adjacent layers. The tape layer may optionally be a polymer or composite or a combination of materials, also optionally comprising a tubular composite layer. Tape layers can be used to help prevent metal-to-metal contact to help prevent wear. Tape layers over tensile armours can also help prevent "birdcaging".

The flexible pipe body also includes optional layers of insulation and/or metal winding or polymer layers or tape layers or layers including special materials such as optical fibres and an outer sheath 190, which comprises a polymer layer used to protect the pipe against penetration of seawater and other external environments, corrosion, abrasion and mechanical damage. Any thermal insulation layer helps limit heat loss through the pipe wall to the surrounding environment and may comprise layers of tape or at least one extruded layer of insulating material.

Each flexible pipe comprises at least one portion, referred to as a segment or section, of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
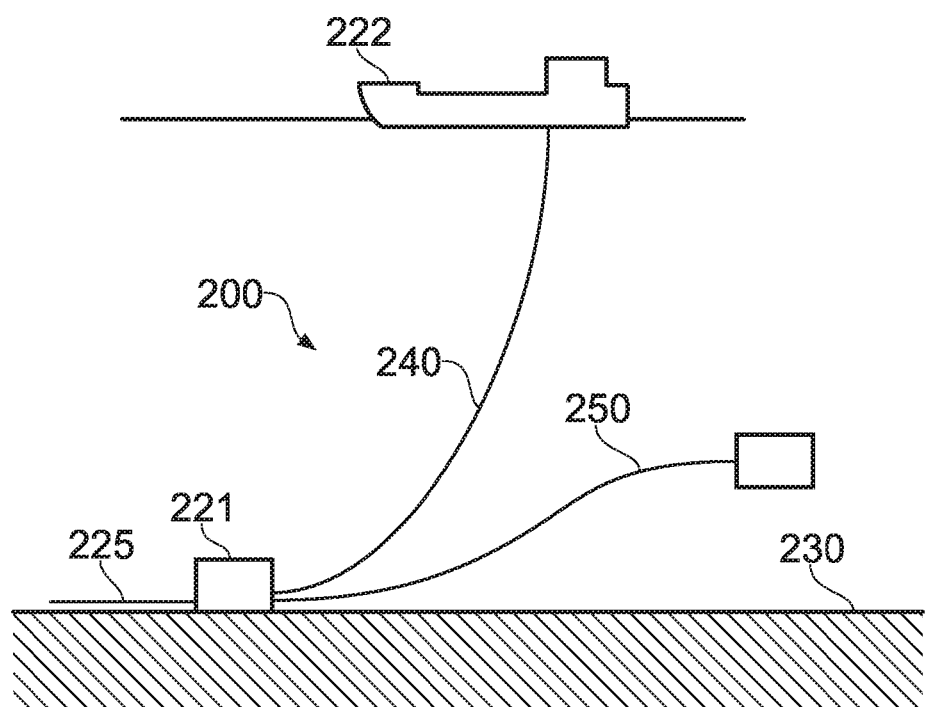
FIG. 2 illustrates uses of flexible pipe incorporating the flexible pipe body.

FIG. 2 illustrates a riser assembly 200 suitable for transporting production fluid such as oil and/or gas and/or water from a sub-sea location 221 to a floating facility 222. For example, in FIG. 2 the sub-sea location 221 includes a sub-sea flow line 225. The flexible flow line 225 comprises a flexible pipe, wholly or in part, resting on the sea floor 230 or buried below the sea floor and used in a static application. The floating facility may be provided by a platform and/or buoy or, as illustrated in FIG. 2, a ship. The riser assembly 200 is provided as a flexible riser, that is to say a flexible pipe 240 connecting the ship to the sea floor installation. The flexible pipe may be in segments of flexible pipe body with connecting end fittings.

It will be appreciated that there are different types of riser, as is well-known by those skilled in the art. Certain embodiments of the present invention may be used with any type of riser, such as a freely suspended (free-hanging, catenary riser), a riser restrained to some extent (buoys, chains), totally restrained riser or enclosed in a tube (I or J tubes). Some, though not all, examples of such configurations can be found in API 17J. FIG. 2 also illustrates how portions of flexible pipe can be utilised as a jumper 250.

Figure 3:
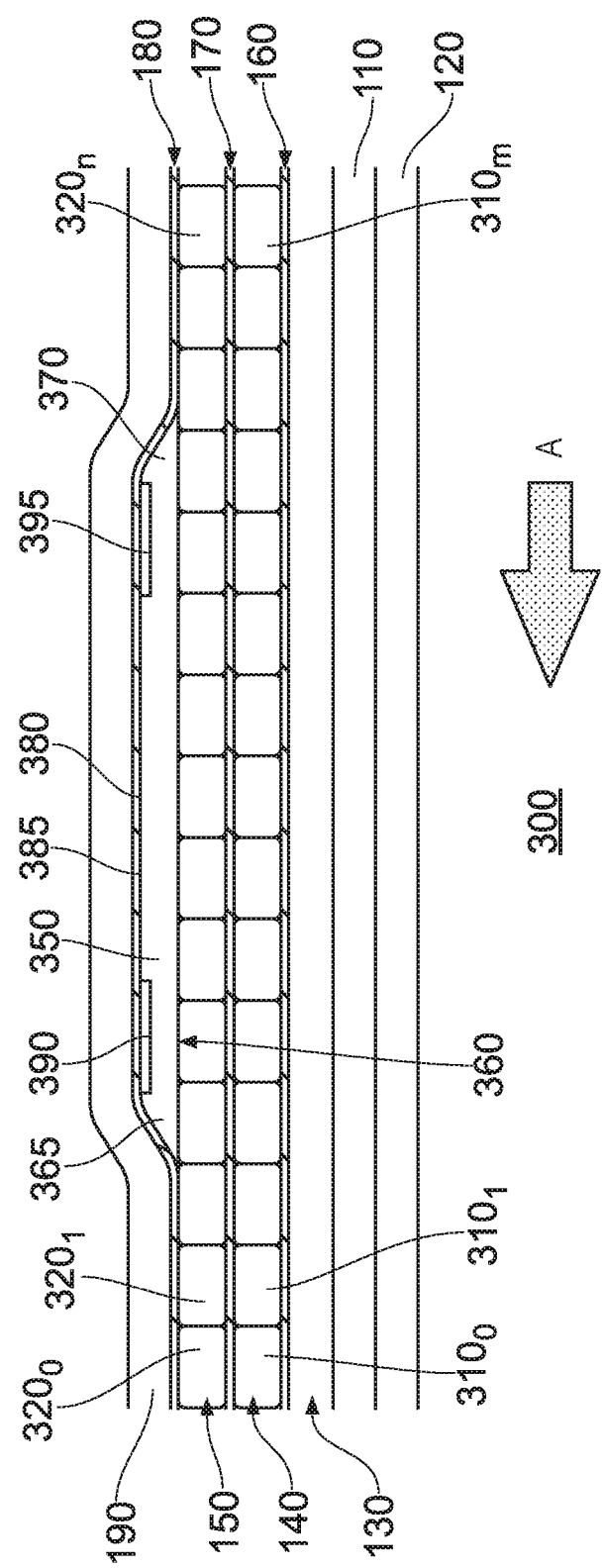
FIG. 3 illustrates a cross section along a length of flexible pipe body.

FIG. 3 illustrates a cross section through a short length of the flexible pipe body 100 shown in FIG. 1 in more detail. As shown in FIG. 3 a carcass layer 120 supports a barrier layer 110. An inner surface of the barrier layer 110 provides the fluid retaining surface which defines a bore region 300 along which transport of production fluids can take place. The direction of flow of the production fluid is illustrated by arrow A in FIG. 3 although it will be appreciated that the flexible pipe may be utilised in different directions.

An innermost tape layer 160 is located on a radially outermost surface of the pressure armour layer 130 to help support windings of the pressure armour layer. This innermost tape layer 160 also helps provide anti-fretting effects between the inner/underlying pressure armour layer 130 and windings of the first tensile armour layer 140. Adjacent windings $310_{0, 1, \ldots m}$ of tensile armour wire of the first tensile armour layer are illustrated in FIG. 3. The innermost tape layer 160 is an intermediate layer between a pressure armour layer 130 and an inner tensile armour layer 140.

A further tape layer 170 is an intermediate layer between the first tensile armour layer 140 and the second tensile armour 150. Adjacent windings $320_{0, 1 \ldots n}$ of the second tensile armour wire provide the outer tensile armour layer 150.

A further tape layer 180 is wound outside the second tensile armour layer 150. This helps provide support and anti-birdcaging effects to the tensile armour layer/s. The outer sheath 190 is formed outside the outer tape layer 180. This further tape layer 180 is an intermediate layer between the outer tensile armour layer (and mount body) and an overlying layer.

Also illustrated in FIG. 3 is a substantially cylindrical mount body 350 which is provided over the outermost tensile armour layer 150. A radially innermost surface 360 of the mount body 350 is substantially cylindrical and smooth (it could alternatively be selectively profiled) and has an inner dimension sized to provide an interference fit with the outer surface of the windings $320_{0, 1, \ldots n}$ of the radially outermost tensile armour layer 150. The mount body 350 has a tapered first end 365 at a downstream end of the mount body 350 and a further tapered end 370 spaced apart from the first end at an upstream end of the mount body. It will be appreciated that the mount body 350 may be provided in either orientation (facing an expected flow or facing with the flow).

A radially outermost surface 380 of the mount body is provided and includes the radially outer surface of the two tapered ends 365, 370, a substantially cylindrical central region 385 and a first recessed region 390 at a downstream end of the mount body 350 and a further recessed region 395 at an upstream end of the mount body.

FIGS. 4A and 4B help illustrate the mount body 350 located over the outer surface of the outermost tensile armour layer 150 during manufacture of flexible pipe body. As illustrated in FIG. 4A the mount body 350 is a substantially cylindrical member which has a first open mouth at a first end of the cylindrical body and further open mouth at a remaining end of the cylindrical body. As illustrated in FIG. 4A the mount body is provided in two substantially C-shaped body parts 400, 410. When the two C-shaped parts are put together a ring-like or bracelet-like member is formed. The multiple portions of the body can be placed together subsequent to the outer tensile armour layer 150 being manufactured and secured in place. Aptly the C-shaped (or other shaped) parts are screwed together or secured via self adhesive tape. Alternatively the mount body may be a single integral piece slid along the tensile armour layer or alternatively may be formed from more than two mount body portions.

Also shown in FIGS. 4A and 4B is a blind hole 420 in one of the mount body parts 400. This is a threaded hole which has an end terminating within the body of the first portion 400 of the mount body 350. A similar blind hole 430 may optionally be provided in the remaining mount body part 410. Each threaded blind hole provides a securing element which is useable subsequent to completion of the manufacture of the flexible pipe body to enable ancillary equipment such as an anode clamp, stiffener element or buoyancy module or the like to be secured to the flexible pipe body prior to installation or subsequent to installation. It will be appreciated that the threaded hole could be a threaded throughhole or other securing mechanism that mates with another securing element of the ancillary equipment in use.

Figure 4B:
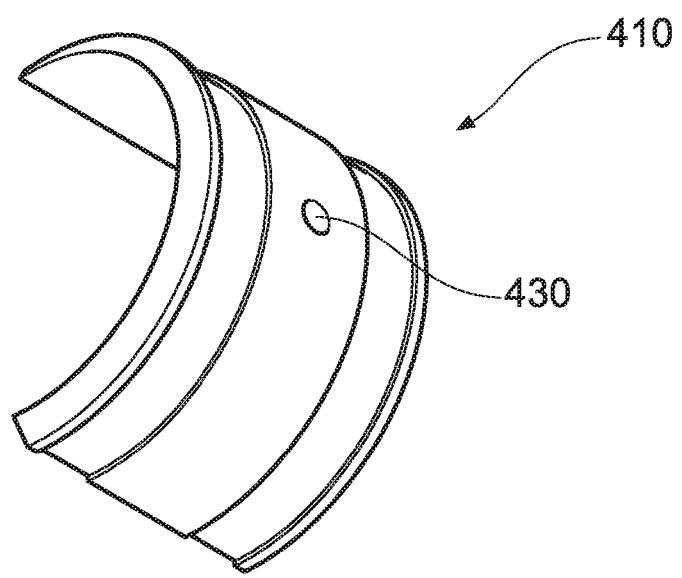

FIG. 4 also helps illustrate how the spaced apart recessed regions 390, 395 of the mount body each provide a substantially cylindrical outer surface. The two thus provided surfaces are spaced apart and substantially parallel. More than two spaced apart recessed regions could optionally be utilised. FIG. 4B helps illustrate how the inner surface of the mount body can be smooth.

The mount body 350 illustrated in FIG. 4 has a thickness of about around 0.7 cm in the central region between the spaced apart recesses 390, 395. Aptly as an alternative the mount body has a thickness of between 5 and 20 mm. Aptly the thickness is about around 10 mm.

The mount body 350 has a thickness which makes the mount body rigid enough to not deform in use. Furthermore the thickness is sufficiently thick taking into account the material used to enable any ancillary equipment to be secured to the mount body in use. Aptly the mount body portions are each formed from a common material. Aptly the mount body portions are manufactured from possible materials include, but are not limited to, steel, iron, copper, aluminium, titanium, magnesium, zinc alloy and/or other electrically conductive materials. Carbon fibre composite or other composite materials that are electrically conductive could also be utilised.

The mount body 350 shown has an axial length of around 70 to 150 mm. Aptly the axial length is around 100 mm.

It will be appreciated that the mount body 350 is located over the outermost tensile armour layer 150 during manufacture of the flexible pipe body. Thereafter an outer "anti-birdcaging" tape layer 180 can be wound over the outer surface of the tensile armour layer 150 and over the mount body 350. Alternatively the tape layer may be terminated/started on either side of the mount body 350. The mount body may also comprise one or more teeth or other clamping elements for clamping onto the edges of a terminated tape layer 180. This helps secure the tape/s in the tape layer as well as achieving a good conductive contact with the armour layer 150. Thereafter the outer sheath 190 and any optional intervening further layers, such as insulating layers, can be formed.

FIG. 5 helps illustrate a region of the flexible pipe body where the bracelet-like mount body is located under the outer sheath 190. The outer surface of the pipe body is shown swollen in an exaggerated way in the Figure to help understanding. FIG. 5 helps illustrate how an indicator 500 can be provided on an outer surface 510 of the outer sheath to help provide subsequent users with a guide as to a location of each securing element of the mount body.

It will be appreciated that a wide variety of indictors could be utilised. For example a single mark may be made or multiple marks giving guidance as to the securing element location can be utilised. The mark or marks may optionally be coloured. A circled cross is shown in FIG. 5. Aptly the indicator is a stamped region in the outer surface 510 of the outer sheath 190. It will be appreciated that if the bracelet-like mount body includes multiple fastening points then an indicator for each fastening point may be provided. Alternatively a single indicator can be provided providing a subsequent user knows of a distribution scheme for each fastening point of the mount body so they only need to identify one valid position It will be appreciated that whilst the mount body shown in FIGS. 3 and 4 are shown at a single location along a length of flexible pipe body multiple similar mount bodies each separated from one another by a common or optionally different distance may be provided at selected locations along a length of flexible pipe body as it is manufactured. Thereafter when the flexible pipe body, as part of a flexible pipe, is installed at a work site as a flow line or riser or the like ancillary equipment such as an anode clamp can be secured to the outside of the flexible pipe using one or more of the mount bodies. As a result a very convenient mounting mechanism is inbuilt into flexible pipe body at the point of manufacture for subsequent optional use. The securing process can be permanent or replaceable in the sense that ancillary equipment may be permanently fastened to the mount body or may be fastened and then removed and replaced by other ancillary equipment including optionally a sealing "blank".

FIG. 6 illustrates the mounting point provided by the mount body 350 shown in FIGS. 3 and 4 in more detail but with ancillary equipment in the form of an anode clamp, useable as a mount for anode elements, secured to the mount body. As illustrated in FIG. 6 in order to secure the anode clamp 600 to the mount body 350 an aperture 610 is cut at a location identified by the indicator 500. The aperture 610 has a size determined by a size of the anode clamp 600 to be secured to the mount body. It will be appreciated that whilst the ancillary equipment shown in FIG. 6 as an anode clamp should be in electrical connection to the mount body, different types of ancillary equipment may optionally be connected to the mount body without forming an overlarge aperture in the outer sheath. Rather a body part of the ancillary equipment may merely be urged against an outer surface 510 of the outer sheath and then one or more securing elements such as bolts selected to mate with the securing element 420 in a mount body can be driven through the outer sheath. For example the ancillary equipment may be secured using bolts which pass through small apertures made in the outer sheath and screwed into the threaded blind hole 420 of the mount body. Metal bolts thus provide an electrical connection between the mount body and the anode clamp. The outer sheath in such circumstances can act as a stand-off. Additional sealing O-rings or the like may be utilised between the ancillary equipment and the outer sheath to help provide a seal around the aperture/s. This helps prevent seawater ingress into the annulus of the pipe body.

Turning again to FIG. 6 the aperture 610 is cut through the outer sheath to have a size and shape configured to coincide with a size and shape of the anode clamp 600. The aperture is made not only through the outer sheath but also through the outer tape layer 180. Alternatively if the outer tape layer 180 includes electrically conducting elements (see discussion later) the anode clamp 600 may rest on an outer surface of that tape layer.

FIG. 6 helps illustrate how a downstream clip 620 and an upstream clip 630 may be wrapped around the outer sheath and tightened to drive the outer sheath material and tape layer into respective recessed regions 390, 395. Each clip 620, 630 is a ring like element which can be tightened to consolidate outer sheath material and tape layer material into a respective recess. As a result a liquid tight seal can be provided on adjacent sides of the anode clamp to help prevent ingress of seawater into the annulus region provided between an inner surface of the outer sheath and a radially outer surface of the barrier layer. The recessed regions 390, 395 may also comprise a saw-tooth or similar profile in order to help sealing against the outer sheath material.

FIG. 6 helps illustrate how a bolt 640 can be located in a recess 650 in the anode clamp 600 and can be driven to secure into the blind threaded hole 420 in the mount body thus securing the anode clamp 600 to the mount body. It will be appreciated that multiple bolts distributed around the circumference of the anode clamp could be utilised. The securing process draws the anode clamp into close contact with the mount body.

In the case of the ancillary equipment being an anode clamp, as previously discussed, the anode clamp 600 makes an electrical connection to the metallic mount body 350, or optionally to just at least a region of the mount body that is electrically conductive, and through the mount body to the outermost tensile armour windings. As a result cathodic protection can be provided to the outer most tensile amour wire windings by attaching anode blocks to the anode clamp 600. If each intermediate tape layer is electrically conductive (see later) the anode blocks are thus electrically connected to many metal layers.

FIG. 7 helps illustrate a flexible pipe which includes a segment of flexible pipe body 100 with a first end fitting 710 at a first respective end of the flexible pipe body and a further end fitting 720 at a remaining end of the flexible pipe body. The flexible pipe shown in FIG. 7 is an elongate structure which can in practice have a length of many kilometres between the end fittings. Anode blocks 730 are illustrated secured circumferentially around the anode clamp 600. As illustrated in FIG. 7 the location of the anode blocks 730 is shown a considerable distance away from any end fitting. It will be appreciated that end fittings could additionally or optionally utilise anode blocks in addition to the anode blocks 730 and anode clamps 600 and mounting mechanism previously described. The anode clamp 600 and anode block 730 can thus be provided distal to (or indeed proximate to if desired) any end fitting. Aptly the mount points and anode clamps are more than 2 kilometres from any end fitting. Aptly the anode blocks and associated mount are more than one kilometre from any end fitting. Aptly the distances p and d shown in FIG. 7 are both greater than 1 km. The distances p and d can be the same or different.

FIG. 7 also helps illustrate how a conventional anode clamp 740 may be secured to an end fitting 720 and multiple anode blocks 750 (three shown in FIG. 7 secured via the clamp to the end fitting. Such an anode clamp 740 and anodes 750 provide CP to a region proximate to the end of the flexible pipe body near the end fitting 720. It will be appreciated that if desired similar anode clamps and anode blocks could optionally be additionally secured to the remaining end fitting 710.

Cathodic protection can thus be provided to a flexible pipe via anode elements mounted to end fittings and/or to anode elements secured in a mid-line location but without needing back-to-back end fittings.

FIG. 8 helps illustrate an intermediate tape layer 170 in more detail. It will be appreciated that the further intermediate tape layers 160, 180 could be similarly provided. As illustrated in FIG. 8 the tape layer is a relatively thin layer formed by winding thin, long, substantially flat, strips helically around an underlying layer. Optionally the elongate strips of tape can be an electrically insulating material and are used to provide anti-fretting properties (preventing adjacent metallic layers from rubbing against each other). Alternatively, as illustrated in FIG. 8, an intermediate tape layer can be formed by winding two different strips each having different characteristics. In FIG. 8 an electrically insulating tape formed by polypropylene or the like is wound over an underlying layer (in the example shown in FIG. 8 over the innermost tensile armour layer 140). The tape is thin and flexible so that adjacent windings $800_{0, 1 \ldots 4}$ of tape overlap and curve. Windings $810_{0, 1 \ldots 4}$ of a further strip-like tape are illustrated in FIG. 8. These are formed from a metallic material such as steel or the like. Other electrically conducting materials such as, but not limited to, copper, aluminium, nickel, gold or silver foil or tapes comprising alloys of these or comprising other conductive materials such as graphene or the like could optionally be utilised. The electrically insulating windings and electrically conductive windings are interposed. In this way the tape layer provides a combination of cheap and flexible anti-fretting characteristics together with an electrically conductive pathway which electrically connects an underlying layer such as a metallic under layer with an overlying layer such as a metallic over layer (for example a first tensile armour layer 140 can be electrically connected to a second tensile armour layer 150). As a result the windings of an overlying layer and the windings of an underlying layer are electrically interconnected via an intermediate layer. As a result a net electrical resistance offered by any metallic layer which extends along a length of the flexible pipe body is reduced. As a result attenuation effects otherwise expected with CP systems are significantly reduced. As a result a frequency of anode elements that are needed along a length of flexible body is reduced relative to conventional techniques.

An intermediate tape layer which includes electrically conducting elements and electrically insulating elements enables a variety of materials to be used and makes use of material characteristics to the best of those materials ability. For example electrically insulating materials can be utilised which provide superior anti-fretting and/or support capabilities. Additionally a material that is highly electrically conductive can be utilised and distributed as a winding throughout the intermediate layer to provide a bridge forming an electrical connection pathway between otherwise spaced apart layers. By electrically connecting opposed layers together an electrical resistance per unit length of the flexible pipe body is much reduced relative to conventional techniques and thus attenuation effects can be reduced. As a result anode elements are needed less frequently along a length of flexible pipe body than would otherwise be needed according to conventional techniques to provide a desired level of cathodic protection. It will be appreciated that whilst the intermediate layer shown in FIG. 8 includes an electrically insulating tape wound adjacent to, and sequentially alternating with, an electrically conductive tape it is possible according to certain embodiments of the present invention to utilise multiple insulating tape windings with a single electrically insulating tape winding or vice versa depending upon desire.

Aptly the tapes are wound helically around an underlying layer using a winding station that rotates with one or more sources of tape feeding the insulating tape/s and electrically conducting tape/s to respective touchdown points. Those touchdown points enable each continuous elongate tape to be simultaneously wound albeit at offset positions circumferentially and/or longitudinally. In this way immediately next windings of a different tape can have a 0-90% overlap with an immediately preceding winding (which may be of the same or different tape type). Aptly there is at least a partial overlap of the tape windings.

FIG. 9 helps illustrate how a multi tape layer structure can be utilised proximate to the inner tensile armour wire layer 140 and outer tensile armour layer 150 of flexible pipe body 900. The flexible pipe body 900 includes an inner carcass 120 which supports an inner barrier layer 110. It will be appreciated that certain embodiments of the present invention are not restricted to rough bore applications and that the carcass layer is thus optional. A pressure armour layer 130 supports the underlying barrier layer 110.

A first supporting layer 960 is provided on the radially outer surface of the pressure armour layer between the pressure armour layer 130 and the inner tensile armour layer 140. A further supporting layer 970 is disposed between the inner tensile armour layer 140 and the outer tensile armour layer 150. Another supporting layer 980 is located radially outside the outer tensile armour layer 150 between the outer tensile armour layer 150 and the inner surface of the outer sheath 190. The outer supporting layer 980 is a layer formed from multiple sub layers. Four sub layers are shown making up the supporting layer 980 in FIG. 9. A first sub layer 981 shown is the radially innermost layer of the supporting layer 980. This sub layer 981 includes a helically wound electrically conductive tape interposed with a constraining tape. A further sub layer 982 is provided by helically winding a reinforced tape over the underlying first sub layer 981. The windings of the overlying sub layer 982 do not overlap. In practice gaps may be left between adjacent edges of the tape. Alternatively that tape may overlap by between 0 and 90%.

A further sub layer 983 is likewise formed over the underlying sub layer 982. Aptly as shown the windings of the tape in this further sub layer 983 overlap in a brick bonded fashion with the windings of the underneath sub layer 982. A further outermost sub layer 984 is likewise formed by helical windings of a constraining tape. In the embodiment illustrated in FIG. 9 these windings in the outermost sub layer 984 do not overlap. It will be appreciated that alternatively the windings could overlap between 0 and 90%.

With reference to the innermost supporting layer 960 shown in FIG. 9 this is formed partially by helical windings 910 of a tape which is electrically conducting. Aptly these are formed from a metallic material such as steel or the like. Other electrically conducting materials such as, but not limited to, copper, aluminium, nickel, gold or silver foil or tapes comprising alloys of these or comprising other conductive material such as graphene or the like could optionally be utilised. These windings are interposed with windings of a further tape 920 which is a constraining tape. That is to say the tape has a high strength and can be wound under tension to help prevent radially outward motion from the underlying windings of the pressure armour layer. The windings of the electrically conductive tape 910 put the pressure armour windings in electrical contact and thus connection with tensile armour wires of the innermost tensile armour layer 140. Furthermore the windings of the electrically conductive tape 910 provide continuity between the wires which are helically wound to provide the innermost tensile armour layer. That is to say the electrically conductive tape of the supporting layer 960 contacts multiple, and possibly all, tensile armour wires that form the innermost tensile armour layer 140. This helps provide continuity so that all wires are effectively electrically connected together. To an extent this supporting layer also helps maximise continuity of the windings of the pressure armour layer.

The further supporting layer 970 is likewise formed as a single layer manufactured by interposed windings of two different tapes. An electrically conductive tape is used to form one set of windings 910 and a constraining tape 920 is wound helically in an interposed fashion thereby interdigitating windings in the supporting layer. This helps provide anti-birdcaging properties which provide radial support to prevent radial outward movement of tensile armour wires in the innermost tensile armour layer 140 whilst simultaneously interconnecting all tensile armour wires that form the innermost tensile armour layer 140. The electrically conductive tape 910 windings likewise are in an abutting relationship with the radially inner surface of the tensile armour wires of the outer tensile armour layer 150. Thus the same windings of the supporting layer 970 which are interposed between the innermost tensile armour layer 140 and the outermost tensile armour layer 150 serve a dual purpose of providing continuity of the tensile armour wires of the innermost tensile armour wire layer and the tensile armour wires of the outer tensile armour layer 150. These windings likewise provide an electrical pathway which bridges between the tensile armour wires in the spaced apart tensile armour layers to help provide an electric pathway for cathodic protection systems.

As noted above the supporting layer between the radially outer surface of the outer tensile armour layer 150 and the inner surface of the outer sheath is a multi sub-layer structure. Multi sub-layer supporting layers may be alternatively used between tensile armour winding layers or between the inner tensile armour layer and the pressure armour layer. An innermost sub layer 981 of the outermost supporting layer is manufactured in a similar manner to the two previously described supporting layers 960, 970. That is to say windings of an electrically conductive tape 910 are interposed with windings of a constraining tape 920 to form a sub layer. This helps provide electrical continuity between wires forming the outer tensile armour layer whilst also providing radial support to prevent radially outward motion of the wires of the outer tensile armour wire layer to help prevent buckling/birdcaging.

The three further sub layers 982, 983, 984 of the supporting layer 980 between the outer tensile armour and the outer sheath are provided by reinforced windings 930 of a reinforced elongate tape 950. These windings shown do not overlap and thus overlap by 0%. Alternatively as the windings may be manufactured from a flexible, conformable material the windings may overlap as per the windings of the other supporting layers described with respect to FIG. 9. If these outer sub layers are formed from a tape which includes an electrically conductive element or elements or is manufactured from a material which is itself electrically conductive or which forms an electrically conductive matrix in which further elements are disposed, an electrically conductive pathway is thus provided across the entire annulus between in the inner surface of the outer sheath 190 and the outer surface of the barrier layer 110. This helps maximise performance of a cathodic protection system. This is also helpful for other purposes where an electrical conductive path is desired between elements in flexible pipe body. In the embodiment shown in FIG. 9 the three outer sub layers are not electrically conductive but are manufactured to maximise the anti-birdcaging effect by constraining radially outward motion of underlying layers. It may also be noted that the selection of materials for the electrically conducting tape 910 and the constraining tape 920 may be different for different supporting layers 960, 970 and 980 in the pipe body structure, depending on factors such as cost, strength and interfacial loading between layers, which may be calculated by those skilled in the art. For the absence of doubt, the constraining tape 920 in supporting layers 960 and 970 may be selected as a polyamide tape reinforced with steel wires, the conducting tape 910 may be selected as an aluminium tape; within the same structure in supporting sub layer 981 the constraining tape 920 may be polyamide reinforced with aramid fibres, and the conducting tape 910 may be selected as a nickel alloy strip. Further to this sub layers 982, 983 and 984 may be of different materials again.

FIG. 10 illustrates an alternative supporting layer 1000 in more detail. The supporting layer 1000 includes four sub layers 1010, 1020, 1030, 1040. This supporting layer 1000 can be used in various locations throughout the cross section of flexible pipe body One possible location is in the location described with respect to outermost supporting layer 980 in FIG. 9. The supporting layer 1000 shown in FIG. 10 is similar to the outermost supporting layer 980 shown in FIG. 9. That is to say the three outermost (from a radial position) sub layers are formed by non-overlapping windings of a reinforced tape. The innermost sub layer 1010 of FIG. 10 is formed by windings of an electrically conductive tape 1050 interposed with windings of a constraining tape 1060. The constraining tape 1060 helps maximise the constraining effect caused overall by the supporting layer whilst still retaining interposed windings of an electrically conductive tape which can help provide continuity for an underlying layer.

FIG. 11 illustrates a further supporting layer 1100. This alternative supporting layer 1100 structure is formed by four sub layers each of which is formed by helically winding an electrically conductive tape interposed with a constraining tape 1160. FIG. 11 helps illustrate how adjacent sub layers in a supporting layer which are formed by interposing windings of two different materials can overlap to some extent with the windings of preceding windings of precedingly manufactured sub layers. By offsetting the start point of windings in a subsequently manufactured sub layer it is possible to ensure that windings of an electrically conductive tape that form a new sub layer contact, at least to some extent, windings of an electrically conductive tape from a preceding underlying sub layer. As a result as sub layers are built one on top of each other (in the radial direction) a pathway is generated by successive electrically conductive tape windings contacting each other. Depending upon the degree of lateral offset and overlap this pathway through the whole supporting layer 1100 can follow a generally "vertical" direction or can be substantially angled with respect to a "vertical" direction which corresponds to a radial direction orthogonal to a primary axis of a bore of the flexible pipe body. This can be convenient for forming electrically conductive pathways around particular features within flexible pipe body. One, two, three, four or more sublayers can be formed on top of each other in this way.

In the embodiment described with respect to FIG. 11 the innermost sub layer 1165 includes windings of an electrically conductive tape interposed with a constraining tape. The electrically conductive tape windings help provide continuity between windings of metallic elements in an underlying layer. Likewise an outermost sub layer 1170 provided by interposed windings of an electrically conductive tape and a reinforced tape can help provide continuity between multiple wires in a layer radially outside but abutting the outer sub layer 1170 of the supporting layer 1100. The two intermediate sub layers in FIG. 11 are provided to help provide an electrically conductive pathway bridging between the outermost sub layers and also including constraining tape which helps provide an anti-birdcaging effect for underlying layers.

FIG. 12 illustrates an alternative supporting layer 1200. This layer can be located in various locations throughout the cross section of flexible pipe body. Aptly the supporting layer 1200 can be located radially speaking immediately inside a tensile armour layer. The supporting layer 1200 shown in FIG. 12 includes five sub layers. A radially innermost sub layer 1210 is provided by an electrically conductive tape being interposed with windings of a reinforced tape. Three further sub layers radially outside the innermost sub layer 1210 are provided by windings of a reinforced tape which does not overlap. An outermost sub layer 1220 is provided by windings of an electrically conductive tape which does not include windings that overlap. In use such a supporting layer can be located on the radially inner surface of a tensile armour layer. The electrically conductive windings of the outermost (in the radial direction) sub layer 1220 provide continuity between wire windings of a tensile armour layer wound over the supporting layer 1200. The electrically conductive tape windings of the radially innermost sub layer 1210 help provide continuity between windings of an underlying tensile armour layer. It will be appreciated that in the embodiment shown in FIG. 12 there is no electrically conductive pathway which bridges across the whole width of the supporting layer 1200. Nevertheless this layer can be helpful as it helps maximise an anti-birdcaging effect due to the multiple reinforced tape sub layers whilst providing continuity for overlying and underlying wires of tensile armour layers.

FIG. 13 illustrates a still further supporting layer 1300 which in many respects is similar to the supporting layer 1200 shown in FIG. 12. In the supporting layer 1300 shown in FIG. 13 there are six sub layers. The innermost sub layer 1310 is provided by a layer formed by winding an electrically conductive tape interposed with a constraining tape. A radially outermost sub layer 1320 is formed by winding a electrically conductive tape helically in a manner which does not involve it overlapping. The radially outermost sub layer 1320 does however include windings of an electrically conductive tape which overlap with an immediately underlying sub layer 1330 which is likewise formed by windings of an electrically conductive tape which do not overlap. The tape structure of the supporting layer shown in FIG. 13 helps maximise the continuity effect on wires of a tensile armour wire formed radially outside of the supporting layer 1300. The constraining tapes of the central three sub layers help provide radial support for underlying layers to help prevent buckling.

FIG. 14 helps illustrate an alternative supporting layer 1400. This includes five sub layers. A radially innermost sub layer 1410 is formed by helically winding an electrically conductive tape interposed with a reinforced tape. A radially outermost sub layer 1420 is formed by helically winding a further electrically conductive tape with a further constraining tape in an interposed fashion. Three central sub layers are formed by non-overlapped constraining tapes. It will be understood that the radially innermost and radially outermost sub layers of the supporting layer 1400 shown in FIG. 14 help provide continuity between wires in abutting tensile armour wire layers. Meanwhile the central constraining tape sub layers help maximise an anti-birdcaging effect for underlying layers. It will be appreciated that the embodiment shown in FIG. 14 does not provide an electrical conductive pathway through the width of the supporting layer 1400.

FIG. 15 helps illustrate an alternative supporting layer 1500. This includes five sub layers. A radially innermost sub layer 1510 is formed by helically winding an electrically conductive tape interposed with a reinforced tape. This is a sub layer formed in an abutting relationship with an outer surface of an underlying tensile armour layer. A radially outermost sub layer 1520 is formed by helically winding a further electrically conductive tape with a still further electrically conductive tape in an interposed fashion. Alternatively a single further electrically conductive tape may be wound in an overlapping fashion. This helps provide a highly electrically conductive layer formed by tape windings which can help ensure continuity between wires of an overlying layer. Three centrally located sub layers are formed by non-overlapped constraining tapes. It will thus be understood that the radially innermost and radially outermost sub layers of the supporting layer 1500 shown in FIG. 15 help provide continuity between wires in underlying and overlying layers. Meanwhile the central constraining tape sub layers help maximise anti-birdcaging effect for an underlying tensile armour layer. It will be appreciated that the embodiment shown in FIG. 15 does not provide an electrical conductive pathway through the width of the supporting layer 1500.

Throughout this description reference has been made to a supporting layer that is a single layer or a multi-layer structure including multiple sub layers. It will be appreciated that a single layer supporting layer may include windings of multiple tapes and that a single sub layer might include windings of a single tape or windings of multiple tapes. An interface between opposed tapes in any layer or sub layer may be identifiable. Alternatively due to the flexibility of the tapes, windings of a new overlying layer or sub layer being manufactured may partially fill gaps generated by windings in an underlying layer. In this sense it will be understood that a layer or sub layer relates to the structure formed by a single pass manufacturing step. Multiple tapes may be wound simultaneously in any such single pass.

It will also be appreciated that many of the above discussed supporting layers can be utilised in different combinations and in different locations throughout the stratified structure of flexible pipe body.

Certain embodiments of the present invention thus provide a layer or at least one sub layer that include metal tape windings. Such windings may optionally overlap, interconnect or are spaced closely together edge to edge. In this way certain metal tape (or other such liquid impervious material) containing layers (or sub layers) can help provide a water impermeable or water impeding layer to help underlying layers from being degraded by sea water in the case of an outer sheath breach.

Throughout the description and claims of this specification, the words "comprise" and "contain" and variations of them mean "including but not limited to" and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. Flexible pipe body for transporting production fluids, comprising:
   a first tensile armour layer; and
   a first supporting layer radially outside, or radially inside, and in an abutting relationship with the first tensile armour layer;
   wherein:
      the first supporting layer comprises a helically wound constraining tape element and a helically wound electrically conductive tape element;
      the electrically conductive tape element makes electrical contact with and thereby electrically connects multiple tensile armour wires in the first tensile armour layer;
      the constraining tape element comprises a high strength elongate tape; and
      the ratio of thickness to width of the tape is at least 1:5.

2. The flexible pipe body as claimed in claim 1, further comprising:
the first supporting layer comprises a single layer or a plurality of sub layers.

3. The flexible pipe body as claimed in claim 2, further comprising:
said single layer or at least one of the plurality of sub layers comprises windings of the electrically conductive tape element interposed with windings of the constraining tape element in the supporting layer, and optionally each winding of the electrically conductive tape element in a supporting layer wraps helically around an underlying layer and is disposed in an abutting relationship with an outer surface of a tensile armour layer, provided by a surface of each tensile armour wire of the tensile armour layer, wherein the electrically conductive layer contacts at least a plurality of tensile armour wires in the tensile armour layer thereby electrically connecting multiple tensile armour wires to provide electrical continuity therebetween.

4. The flexible pipe body as claimed in claim 2, further comprising:
said plurality of sub layers comprises a first sub layer comprising at least one helically wound constraining tape element and a further sub layer comprising at least one helically wound electrically conductive tape element.

5. The flexible pipe body as claimed in claim 4, further comprising:
the further sub layer abuts the first tensile armour layer.

6. The flexible pipe body as claimed in claim 4, further comprising:
the at least one helically wound constraining tape element comprises a single helically wound constraining tape element that includes windings that overlap by 0 to 80%, or the at least one helically wound constraining tape element comprises a plurality of constraining tape elements that include windings that overlap by 0 to 90%.

7. The flexible pipe body as claimed in claim 4, further comprising:
the at least one helically wound electrically conductive tape element comprises a single helically wound electrically conductive tape element that includes windings that overlap by 0 to 80%, or the at least one helically wound electrically conductive tape element comprises a plurality of electrically conductive tape elements that include windings that overlap by 0 to 90%.

8. The flexible pipe body as claimed in claim 4, further comprising:
the at least one helically wound electrically conductive tape element comprises one or more helically wound electrically conductive tape elements interposed between corresponding windings of a non-electrically conducting tape element, and optionally the non-electrically conductive tape element is an insulating tape element and/or a constraining tape element.

9. The flexible pipe body as claimed in claim 4, further comprising:
at least one still further sub layer between the first and further sub layers, each still further sub layer comprising a layer of interposed constraining tape element and electrically conductive tape element windings or a layer comprising a constraining tape element winding only or a layer comprising electrically conductive tape element windings only.

10. The flexible pipe body as claimed in claim 1, further comprising:
the supporting layer comprises at least one of a polymer tape and/or a fibre reinforced tape and/or a wire, or wire strand reinforced tape, wherein the fibre reinforced tape has a strength of at least 500 MPa when measured at 60° C. according to ISO527-3 or ISO6892-2 or ASTM D3039, as relevant for the material, and using a test speed of 350 mm/minute, and aptly retains a strength of at least 500 MPa when measured at 90° C. according to ISO527-3 or ISO6892-2 or ASTM D3039, as relevant for the material, and using a test speed of 350 mm/minute.

11. The flexible pipe body as claimed in claim 10, further comprising:
the fibre reinforced tape is a tape reinforced with one or more glass and/or carbon and/or basalt and/or aramid and/or polyester fibres and/or wires and/or wire strands, comprising fibre or wire diameters in the range 0.001-1 mm, and optionally the fibre reinforced tape reinforced with one or more glass and/or carbon and/or basalt and/or aramid and/or polyester fibres and/or wires and/or wire strands comprises fibres and/or wires and/or wire strands predominantly aligned in the length direction of the tape.

12. The flexible pipe body as claimed in claim 10 further comprising:
the fibre reinforced tape comprises a lesser proportion of fibres in a direction substantially different from the length direction of the tape, and optionally a lesser proportion of fibres are aligned at an angle at least 30° from the length direction of the tape, optionally at an angle at 90° to the length direction of the tape.

13. The flexible pipe body as claimed in claim 1, further comprising:
the conductive tape element comprises a polymer dosed with a conductive filler material, optionally selected from: copper, aluminium, magnesium, silver, titanium, iron, carbon, graphite, or graphene, defined and differentiated from graphite by ISO/TS 80004-13:2017, or the conductive tape element comprises a metal tape or film of thickness between 0.005 mm and 2 mm, and optionally of thickness between 0.05 mm and 0.5 mm, or the conductive tape element comprises a metal woven band comprising metal wires of thickness between 0.005 mm and 1 mm, and optionally of thickness between 0.01 mm and 0.5 mm.

14. The flexible pipe body as claimed in claim 1, further comprising:
a further tensile armour layer, wherein the first tensile armour layer is a radially inner or a radially outer tensile armour layer with respect to the further tensile armour layer, wherein optionally the first tensile armour layer comprises an outer tensile armour layer;
and optionally the flexible pipe body further comprises a further supporting layer, comprising a helically wound constraining tape element and a helically wound electrically conductive tape element, wound radially outside and adjacent to the further tensile armour layer;
and optionally the flexible pipe body further comprises a still further supporting layer, comprising a helically wound constraining tape element and a helically wound electrically conductive tape element; wherein the first supporting layer, further supporting layer and the still further supporting layer are interdigitated with the first and further tensile armour layers.

15. The flexible pipe body as claimed in claim 1, further comprising:
  a fluid retaining polymer layer radially inside the first tensile armour layer; and
  an outer sheath radially outside of the first tensile armour layer.

16. A flexible pipe for transporting production fluids, comprising:
  the flexible pipe body as claimed in claim 1; and
  at least one end fitting terminating a respective end of the flexible pipe body, and optionally a corrosion protection system, wherein optionally the flexible pipe body comprises at least one anode element distal to each end fitting and the flexible pipe body has a length in excess of 2000 metres.

17. The flexible pipe body as claimed in claim 1, wherein the ratio of thickness to width of the tape is at least 1:10.

18. The flexible pipe body as claimed in claim 1, wherein the ratio of thickness to width of the tape is at least 1:100.

19. A method of providing electrical continuity between tensile armour wires in a tensile armour layer, comprising the steps of:
  providing a first tensile armour layer by helically winding a plurality of tensile armour wires over an underlying layer; and
  providing a first supporting layer in an abutting relationship with the first tensile armour layer by helically winding a constraining tape element simultaneously with an electrically conductive tape element;
  whereby the wound electrically conductive tape element makes electrical contact with and thereby electrically connects multiple tensile armour wires in the first tensile armour layer.

20. The method as claimed in claim 19, further comprising:
  winding the constraining tape element and electrically conductive tape element of the first supporting layer to thereby interpose windings of the constraining tape element with windings of the electrically conductive tape element; optionally winding the first supporting layer and subsequently providing the first tensile armour layer over the first supporting layer, said first supporting layer thereby providing said an underlying layer; and
  optionally providing the first tensile armour layer and subsequently providing the first supporting layer over the first tensile armour layer.

21. The method as claimed in claim 19, further comprising:
  providing the first supporting layer as a single layer comprising windings of the electrically conductive tape element and the constraining tape element or as a plurality of sub layers;
  optionally providing the sub layers by providing a first sub layer comprising at least one helically wound constraining tape element or at least one helically wound insulating tape element or at least one helically wound electrically conductive tape element and a further sub layer comprising at least one helically wound electrically conductive tape element and a helically wound constraining tape element wound in an interposed arrangement with the electrically conductive tape element; and
  optionally providing the further sub layer in an abutting relationship with the first tensile armour layer.

22. The method as claimed in claim 19, further comprising:
  as the electrically conductive tape is wound with the constraining tape simultaneously providing electrical continuity and radial support to wires of an underlying tensile armour layer;
  and optionally the method further comprises winding the constraining tape element comprises winding a tape that constrains radially outward movement of wires of an underlying layer;
  optionally winding the constraining tape element comprises winding at least one of a polymer tape and/or a fibre reinforced tape and/or a wire, or wire strand, reinforced tape with the electrically conductive tape element over the first tensile armour layer;
  optionally winding a further tensile armour layer over the first tensile armour layer or winding tensile armour wires, to provide the first tensile armour layer, over an underlying layer that comprises a further tensile armour layer comprising a further plurality of tensile armour wires or over a further supporting layer over the further tensile armour layer; and
  optionally winding the electrically conductive tape by helically winding a metal tape.

* * * * *